(12) United States Patent
Chida et al.

(10) Patent No.: US 11,372,953 B2
(45) Date of Patent: Jun. 28, 2022

(54) COMMUNICATION DEVICE, COMMUNICATION SYSTEM, AND RECORDING MEDIUM

(71) Applicant: NIPPON TELEGRAPH AND TELEPHONE CORPORATION, Tokyo (JP)

(72) Inventors: Nariyoshi Chida, Musashino (JP); Yo Kanemoto, Musashino (JP); Kazufumi Aoki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 94 days.

(21) Appl. No.: 16/758,408

(22) PCT Filed: Oct. 19, 2018

(86) PCT No.: PCT/JP2018/039050
§ 371 (c)(1),
(2) Date: Apr. 23, 2020

(87) PCT Pub. No.: WO2019/082818
PCT Pub. Date: May 2, 2019

(65) Prior Publication Data
US 2020/0250282 A1  Aug. 6, 2020

(30) Foreign Application Priority Data
Oct. 27, 2017 (JP) .............................. JP2017-208220

(51) Int. Cl.
*G06F 21/14* (2013.01)
*G06F 21/12* (2013.01)
(Continued)

(52) U.S. Cl.
CPC ............ *G06F 21/14* (2013.01); *G06F 21/128* (2013.01); *G06F 21/562* (2013.01); *G06F 21/6218* (2013.01)

(58) Field of Classification Search
CPC ...... G06F 21/14; G06F 21/128; G06F 21/562; G06F 21/6218
See application file for complete search history.

(56) References Cited

U.S. PATENT DOCUMENTS 9,241,004 B1   1/2016 April
2008/0222736 A1   9/2008 Boodaei et al.
(Continued)

OTHER PUBLICATIONS

International Search Report and Written Opinion dated Dec. 11, 2018 for PCT/JP2018/039050 filed on Oct. 19, 2018, 10 pages including English Translation of the International Search Report.
(Continued)

*Primary Examiner* — Kristine L Kincaid
*Assistant Examiner* — Zoha Piyadehghibi Tafaghodi
(74) *Attorney, Agent, or Firm* — Xsensus LLP

(57) ABSTRACT

A communication device is installed in between a client terminal and a web server which performs communication with the client terminal. The communication device includes a memory, and processing circuitry coupled to the memory and configured to of information included in communication between the web server and the client terminal, perform obfuscation with respect to information related to web application, and send communication, which includes information obfuscated at the performing, to destination.

6 Claims, 19 Drawing Sheets

(51) Int. Cl.
  *G06F 21/56* (2013.01)
  *G06F 21/62* (2013.01)

(56) References Cited

U.S. PATENT DOCUMENTS

| | | |
|---|---|---|
| 2009/0144829 A1 | 6/2009 | Grigsby et al. |
| 2010/0228989 A1* | 9/2010 | Neystadt ............ G06F 21/6209 713/185 |
| 2012/0090026 A1* | 4/2012 | Andrews ................ H04L 63/08 726/22 |
| 2012/0124372 A1 | 5/2012 | Dilley et al. |
| 2014/0283140 A1* | 9/2014 | Gorman ................ G06F 21/10 726/30 |
| 2016/0132667 A1* | 5/2016 | Freitas Fortuna dos Santos ........ H04L 9/14 713/189 |
| 2016/0182517 A1 | 6/2016 | Sullivan et al. |
| 2016/0342777 A1* | 11/2016 | Sadhasivan ........... H04L 63/061 |
| 2017/0063923 A1 | 3/2017 | Yang et al. |
| 2017/0126719 A1 | 5/2017 | Mason |
| 2017/0237823 A1 | 8/2017 | Pyper |

OTHER PUBLICATIONS

Thomas, P., "Blind Elephant: Web Application Fingerprinting With Static Files," BlackHat, Version 2, USA, Jul. 28, 2010, pp. 1-11.

* cited by examiner

FIG.4

K1{ cms
K2{ excelpress
K3{ name="generator"
K4{ id="floccinaucinihilipilification"
~L2

COMMUNICATION DEVICE, COMMUNICATION SYSTEM, AND RECORDING MEDIUM

CROSS-REFERENCE TO RELATED APPLICATIONS

The present application is based on PCT filing PCT/JP2018/039050, filed Oct. 19, 2018, which claims priority to JP 2017-208220, filed Oct. 27, 2017, the entire contents of each are incorporated herein by reference.

TECHNICAL FIELD

The present invention relates to a communication device, a communication system, and a recording medium.

BACKGROUND ART

Nowadays, web applications are used in a number of services and have become part of the social infrastructure. However, at the same time, attacks are carried out by taking advantage of the vulnerability in web applications. One of the methods for evaluating whether or not a web application is vulnerable is the web application fingerprinting (WAFP) technology. In the WAFP technology, the web applications being used in a server and their version information are collected. There are two broad methods to implement the WAFP technology.

In the first method, pattern matching of regular expressions is performed, and the peculiar character strings of a web application (such as the web application name, the version information, and the paths to static files) are extracted from the source code. For example, given below is the explanation about an example of a regular expression "Powered by (\w+)" (having the notation adhering to PCRE (Perl Compatible Regular Expressions)). In this first method, under the assumption that the phrase "Powered by" would be followed by the web application name, the character string that includes one or more alphabetical and numerical characters and that follows the phrase "Powered by" is extracted. In the first method, for example, if "<h1> Powered by CMS </h1>" is written in the source code to be subjected to pattern matching, then "CMS" is from the concerned regular expression.

In the second method, an attempt is made to access the paths to known static files. A static file implies a file that is never modified by anyone expect the system administrator. In the second method, if the accessing is successful, it is confirmed whether the contents of the files are consistent. Then, in the second method, if the contents of the files are consistent, it is determined that the corresponding web applications are being used.

For example, assume that "a.com" is using a web application B. Moreover, assume that the web application B is known to possess "/B/includes/c.js". In that case, whether or not "a.com" is using the web application B can be confirmed according to the following sequence of operations. Firstly, "a.com/B/includes/c.js" is accessed, and it is confirmed whether or not "c.js" can be retrieved. If "c.js" cannot be retrieved, then it is not clear whether or not "a.com" is using the web application B. On the other hand, if "c.js" can be retrieved, then it is determined whether or not the contents of "c.js" are consistent with the contents of "c.js" of the web application B. If the retrieved contents are consistent with the contents of "c.js" of the web application B, then "a.com" can be believed to be using the web application B on account of possessing a static file peculiar to the web application B (for example, refer to Non Patent Document 1).

CITATION LIST

Patent Citation

Non Patent Document 1: Patrick S. Thomas, "BLINDELEPHANT: WEB APPLICATION FINGERPRINTING WITH STATIC FILES", [searched on Oct. 2, 2017], Internet <URL: https://community.qualys.com/servlet/JiveServlet/downloadBody/1351-102-7-1642/BlindElephant_WebApp_Fingerprinting-PAPER-v2.pdf>

SUMMARY OF INVENTION

Technical Problem

In the WAFP technology, the information about a web application is collected by extracting the character strings that are peculiar to the web application and that are written in the source code of the web application, and by accessing the known static paths. The information collected using the WAFP technology is usable by an attacker to decide the mode of attack. Hence, prevention of WAFP-attributed disclosure of information about a web application enables defending against an attack. In that regard, conventionally, a countermeasure is proposed in which a web application is altered in such a way that there is no WAFP-attributed disclosure of information about the web application to the outside.

For example, as a first countermeasure against WAFP, there is a technology in which the configuration is done in such a way that the character strings peculiar to a web application (such as the web application name and the version information) are not specified in the source code of the web application. However, in the first countermeasure, there are cases that cannot be handled without modifying the source code itself.

More particularly, explained below with reference to FIG. 20 is a case that cannot be handled without modifying the source code itself and that represents the issue faced in the first countermeasure technology. FIG. 20 is a diagram for explaining a conventional countermeasure technology against WAFP. In (a) in FIG. 20, character strings enclosed in boxes C1P and C2P are the character strings peculiar to a web application. Of those character strings, the entire character string having the "X-Powered-by" header in the box C1P can be deleted, as illustrated in a box C1P' in (b) in FIG. 20, by modifying the configuration file. In contrast, the "div" tag in the box C2P cannot be deleted only by modifying the configuration file; and, as illustrated in a box C2P' in (b) in FIG. 20, the character string remains present, and cannot be handled without modifying the source code itself.

As a second countermeasure against WAFP, there is a technology for modifying the directory structure. However, in the second countermeasure, unless the modification in the directory structure is appropriately reflected in the source code, it does not serve the purpose.

More particularly, explained below with reference to FIG. 21 is a case in which the modification in the source code needs to be appropriately reflected in the source code and which represents the issue faced in the second countermeasure technology. FIG. 21 is a diagram for explaining a conventional countermeasure technology against WAFP. For example, in order to implement a WAFP countermeasure, the directory structure is modified by adding a dummy directory "dummy" after "cms" (see (1) in FIG. 21). At that time, regarding the source code "https://e.com/cms/includes/a.js" that is meant for reading "a.js" from the directory structure illustrated in (a) in the left portion of FIG. 21 (see (2) in FIG. 21); accompanying the change in the directory (see (3) in FIG. 21), the corresponding location in the source code gets changed to "https://e.com/cms/dummy/includes/a.js" (see (b) in the left portion of FIG. 21).

Meanwhile, regarding "d.css" in the directory structure; as illustrated in (b) in the left portion of FIG. 21, since the path is not modified by mistake, "d.css" has become non-callable (see (4) in FIG. 21). In this way, in the second countermeasure technology, there are times when the modification in the directory structure is not appropriately and entirely reflected in the source code.

In this way, in the conventional countermeasures, it is difficult to sufficiently deal with WAFP, and there are times when it is difficult to prevent WAFP-attributed disclosure of web application information to the outside.

The present invention is made in view of the issues mentioned above, and it is an object of the present invention to provide a communication device, a communication system, and a communication program that enable prevention of WAFP-attributed disclosure of web application information.

Solution to Problem

To solve the above problem and attain the object, a communication device according to the present invention is a communication device that is installed in between a client terminal and a web server which performs communication with the client terminal, the communication device including: a memory; and processing circuitry coupled to the memory and configured to: of information included in communication between the web server and the client terminal, perform obfuscation with respect to information related to web application, and send communication, which includes information obfuscated at the performing, to destination.

Advantageous Effects of Invention

According to the present invention, it becomes possible to prevent WAFP-attributed disclosure of web application information.

BRIEF DESCRIPTION OF DRAWINGS

FIG. 4 is a diagram illustrating an exemplary data configuration of a keyword list;

EMBODIMENTS FOR CARRYING OUT THE INVENTION

Figure 1:
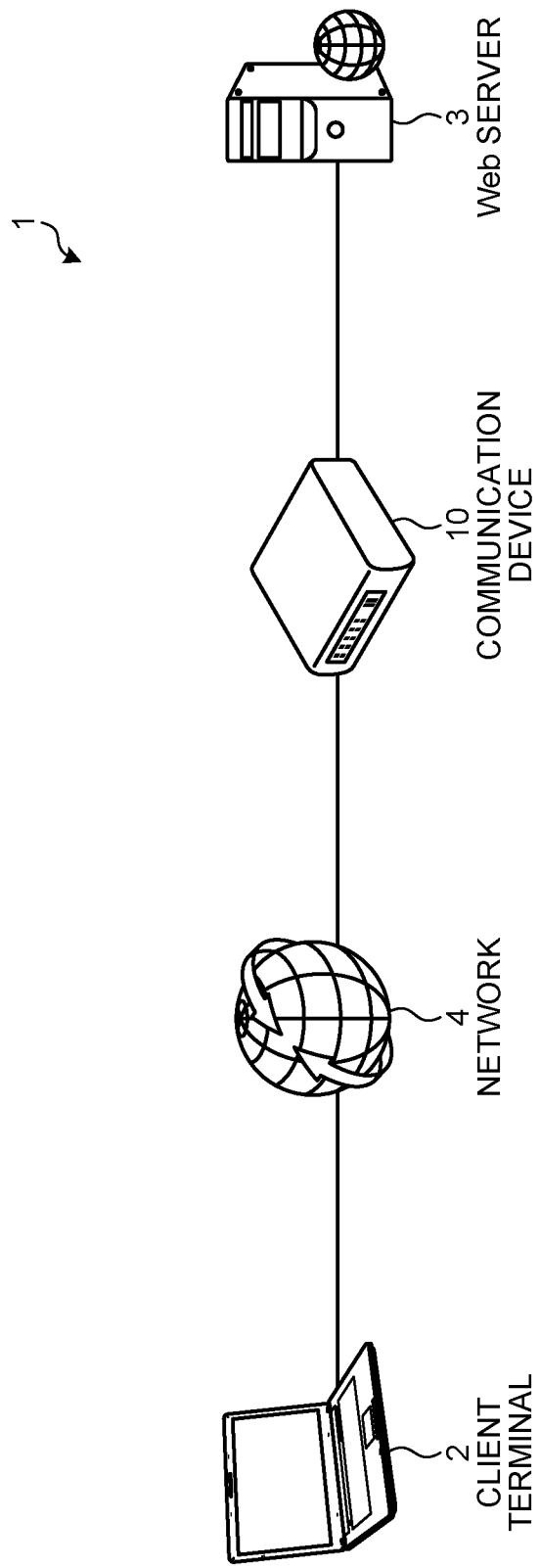
FIG. 1 is a diagram that schematically illustrates an exemplary configuration of a communication system according to an embodiment.

An exemplary embodiment of the present invention is described in detail with reference to the accompanying drawings. However, the present invention is not limited by the embodiment described below. Moreover, in the explanation with reference to the drawings, the same constituent elements are referred to by the same reference numerals.

EMBODIMENT

[Overview of Communication System]

Firstly, explained below with reference to FIG. 1 is a configuration of a communication system according to the present embodiment. FIG. 1 is a diagram that schematically illustrates an exemplary configuration of the communication system according to the present embodiment.

As illustrated in FIG. 1, in a communication system 1; a client terminal 2 and a web server 3, which is to be protected, are connected via a network 4. Moreover, a communication device 10 is installed, as a proxy, prior to the web server 3; and the web server 3 is connected to the network 4 via the communication device 10.

The client terminal 2 is, for example, an information terminal such as a server device, a personal computer, or a smartphone that uses web applications. The client terminal 2 sends, for example, HTTP (HyperText Transfer Protocol) requests to the web server 3.

Moreover, the client terminal 2 receives HTTP responses that have been subjected to obfuscation performed by the communication device 10. At that time, the communication device 10 substitutes the identifier specified in a post-obfuscation HTTP request with the URL corresponding to that identifier.

The web server 3 represents the server of a service provider, and provides services to the client terminal 2. For example, upon receiving an HTTP request from the client terminal 2, the web server 3 sends an HTTP response for the purpose of providing a service corresponding to the request. The web server 3 performs communication with the client terminal 2 via the communication device 10.

The network 4 is, for example, an arbitrary type of network such as a wired or wireless LAN (Local Area Network), a WAN (Wide Area Network), or a VPN (Virtual Private Network).

The communication device 10 is installed in between the web server 3 and the network 4, and functions as a proxy of the web server 3. Of the information included in the communication between the web server 3 and the client terminal 2, the communication device 10 performs obfuscation with respect to the information related to web applications. Then, the communication device 10 sends the communication including the obfuscated information to the destination. For example, the communication device 10 alters HTTP communication.

In this way, in the communication system 1, the communication device 10 is used as a proxy of the web server 3. The communication device 10 relays the communication between the web server 3 and the client terminal 2; and, for example, at the same time alters web-application-related information from among the information included in the HTTP communication, so as to prevent WAFP-attributed disclosure of information without having to alter the web application itself. Given below is the explanation of a configuration of the communication device 10.

[Configuration of Communication Device]

Figure 2:
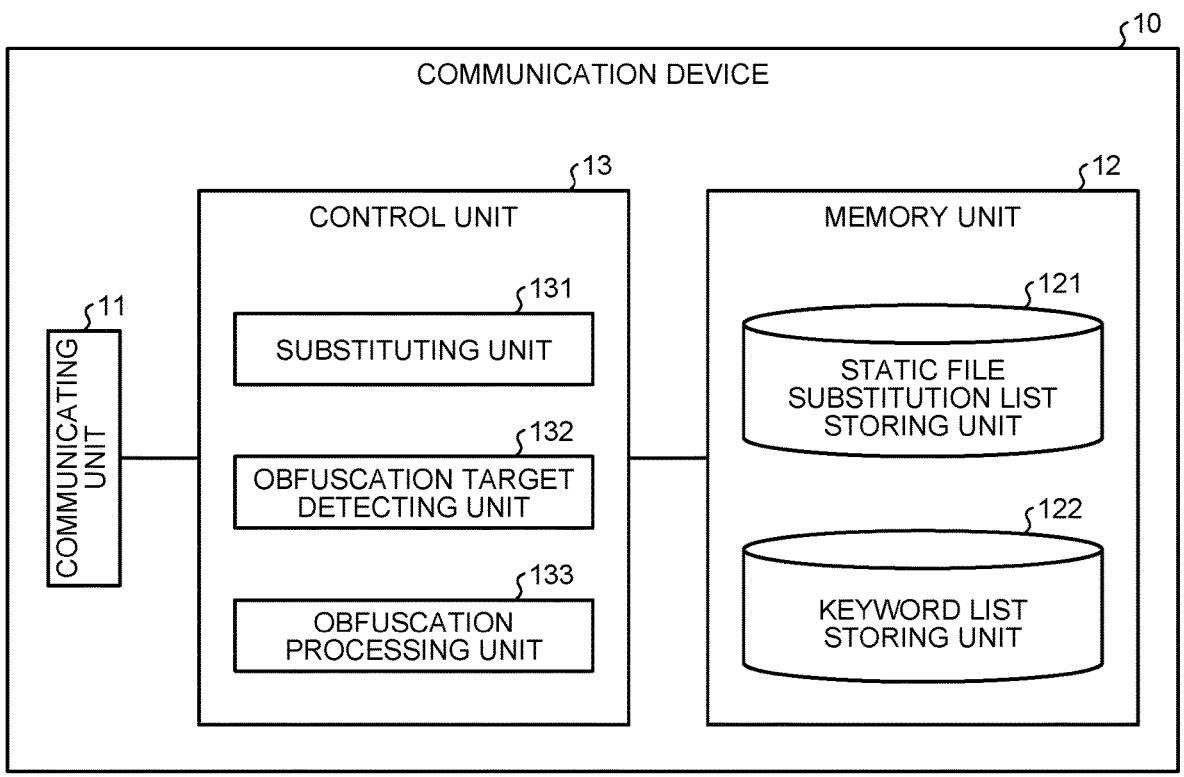
FIG. 2 is a diagram illustrating an exemplary configuration of a communication device illustrated in FIG. 1.

FIG. 2 is a diagram illustrating an exemplary configuration of the communication device 10 illustrated in FIG. 1. As illustrated in FIG. 2, the communication device 10 includes a communicating unit 11, a memory unit 12, and a control unit 13.

The communicating unit 11 is a communication interface for sending a variety of information to and receiving a variety of information from other devices connected via the network 4. The communicating unit 11 is implemented using, for example, an NIC (Network Interface Card), and enables communication between another device and the control unit 13 (described later) via a telecommunication line such as a LAN or the Internet.

More particularly, the communicating unit 11 receives, via the network 4, an identifier-obfuscated HTTP request from the client terminal 2, and outputs it to the control unit 13. Moreover, the communicating unit 11 sends an HTTP request, in which the identifier is substituted with a URL by the control unit 13, to the web server 3. Then, the communicating unit 11 receives an HTTP response sent by the web server 3, and outputs it to the control unit 13. The communicating unit 11 sends an HTTP request, which has been subjected to obfuscation by an obfuscation processing unit 133 (described later), to the client terminal 2 via the network 4. In this way, the communicating unit 11 sends, to the destination, the communication including information obfuscated by the obfuscation processing unit 133.

The memory unit 12 is implemented using, for example, a semiconductor memory device such as a RAM (Random Access Memory) or a flash memory, or a memory device such as a hard disk or an optical disk; and is used to store processing programs meant for operating the communication device and to store the data to be used during the execution of the processing programs. The memory unit 12 includes a static file substitution list storing unit 121 and a keyword list storing unit 122.

The static file substitution list storing unit 121 is used to store pairs of URLs, which indicate the paths to the static files peculiar to web applications, and identifiers, which correspond to the URLs and which are made of arbitrary character strings.

Figure 3:
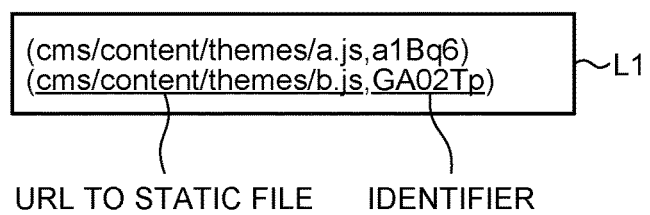
FIG. 3 is a diagram illustrating an exemplary data configuration of a static file substitution list.

FIG. 3 is a diagram illustrating an exemplary data configuration of a static file substitution list. As illustrated in FIG. 3, in a static file substitution list L1, URLs indicating the paths to static files are associated with identifiers corresponding thereto. In the example illustrated in FIG. 3, the first pair includes a URL "cms/content/themes/a.js" associated with an identifier "alBq6", and the second pair includes a URL "cms/content/themes/b.js" associated with an identifier "GA02Tp". The identifiers are made of random character strings, and identifiers corresponding to two arbitrarily different URLs are never identical.

At that time, the control unit 13 refers to the static file substitution list L1 and substitutes the identifier of an HTTP request, which is sent from the client terminal 2, with the URL corresponding to that identifier. Moreover, of an HTTP response sent by the web server 3, the control unit 13 substitutes the URL, which is included in the static file substitution list L1, with the identifier corresponding to that URL. When an HTTP response is received, the client terminal 2 substitutes the identifier, which is included in the HTTP request, with the URL corresponding to that identifier.

The keyword list storing unit 122 is used to store a list of keywords made of character strings peculiar to web applications. FIG. 4 is a diagram illustrating an exemplary data configuration of a keyword list. As illustrated in FIG. 4, in a keyword list L2, the keywords are listed in separate rows. A keyword represents a characteristic string to be obfuscated by the control unit 13 (described later), and is made of a character string peculiar to a web application. In the keyword list L2, all alphabetical characters included in the character strings are written in lower case alphabetical characters. A keyword is, for example, a web application name or some other character string peculiar to a web application.

In the example illustrated in FIG. 4, a web application name "cms" is specified in a row K1, and a web application name "excelpress" is specified in a row K2. In rows K3 and k4 are specified character strings 'name="generator"' and 'id="floccinaucinihilipilification"', respectively, that are peculiar to other web applications. The control unit 13 (described later) refers to the keyword list L2, and detects, as the target for obfuscation, the character string similar to the keyword from an HTTP response sent by the web server 3.

The control unit 13 includes an internal memory for storing programs in which various processing sequences are defined, and for storing necessary data; and performs a variety of processing using the stored information. For example, the control unit 13 is an electronic circuit such as a CPU (Central Processing Unit) or an MPU (Micro Processing Unit). The control unit 13 includes a substituting unit 131, an obfuscation target detecting unit 132 (a detecting unit), and the obfuscation processing unit 133.

The substituting unit 131 refers to the static file substitution list storing unit 121 and substitutes the identifier, which is included in an HTTP request sent by the client terminal 2, with the URL indicating the path to a static file peculiar to the web application that is identified by the concerned identifier. Moreover, the substituting unit 131 refers to the static file substitution list storing unit 121 and substitutes the URL, which indicates the path to a static file peculiar to the web application included in an HTTP response sent by the web server 3, with the identifier corresponding to the concerned URL.

The obfuscation target detecting unit 132 detects, in the HTTP response sent by the web server 3, the portion in which information related to a web application is specified. The obfuscation target detecting unit 132 refers to the keyword list storing unit 122 and detects, as the information related to the web application, the character string similar to the keyword from the HTTP response sent by the web server 3.

The obfuscation processing unit 133 performs obfuscation with respect to the information related to web applications from among the information communicated between the web server 3 and the client terminal 2. The obfuscation processing unit 133 performs obfuscation with respect to the portion detected by the obfuscation target detecting unit 132. The obfuscation processing unit 133 implements a method according to the content type of the HTTP response and performs obfuscation with respect to the portion in which the information related to a web application is specified. Then, the obfuscation processing unit 133 substitutes the character string detected by the obfuscation target detecting unit 132 with the post-obfuscation character string. Meanwhile, if the content type of the HTTP response indicates an image, then the obfuscation processing unit 133 embeds a random character string in the comment of that image.

[Flow of Operations in Communication System]

Figure 5:
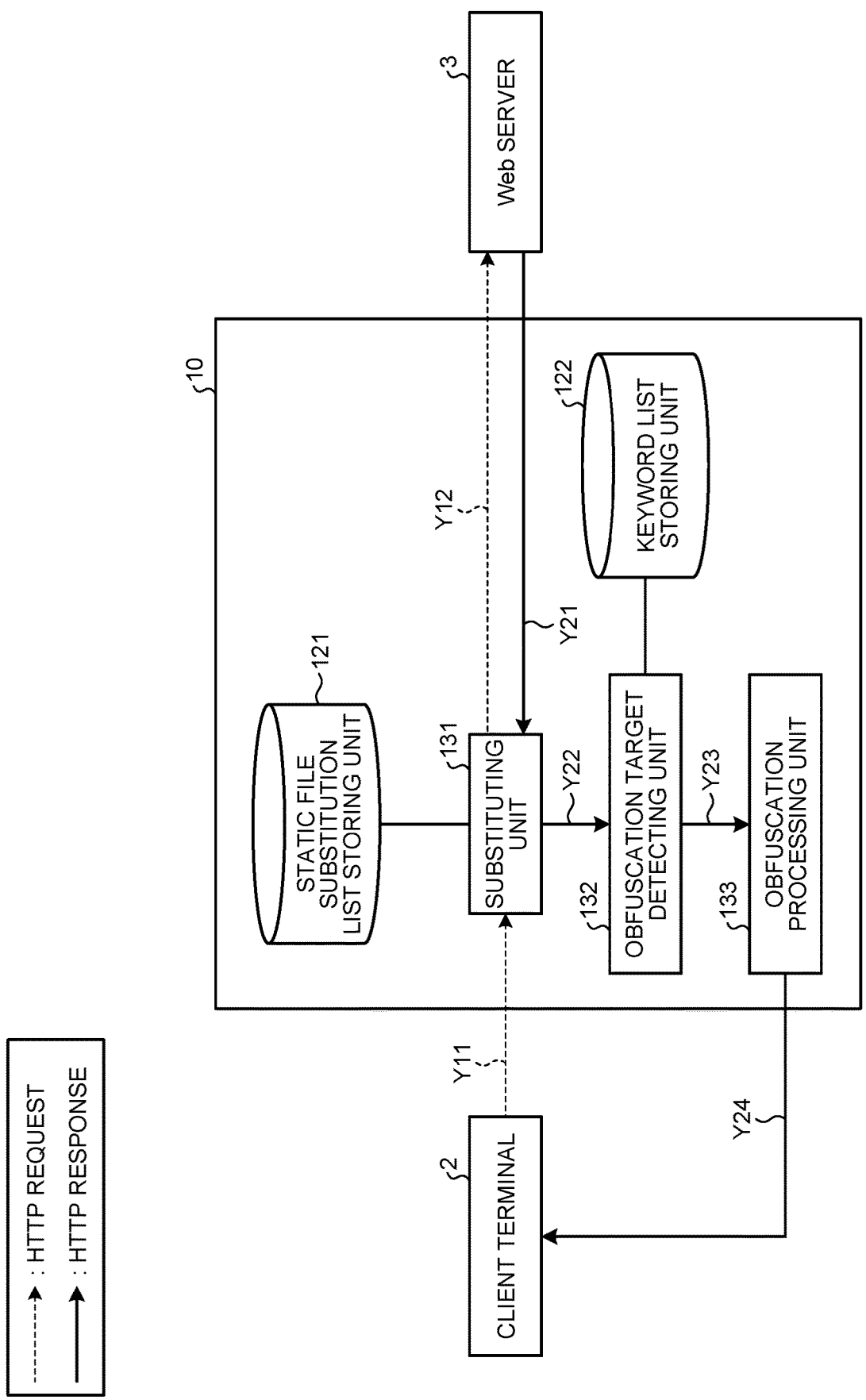
FIG. 5 is a diagram for explaining an overview of the flow of operations performed in the communication system illustrated in FIG. 1.

Given below is the explanation of an overview of the flow of operations performed in the communication system 1. FIG. 5 is a diagram for explaining an overview of the flow of operations performed in the communication system 1 illustrated in FIG. 1. In FIG. 5, only the main parts of the communication device 10 are illustrated, and the network 4 is not illustrated.

As illustrated in FIG. 5, firstly, the client terminal 2 sends an HTTP request to the web server 3 (see an arrow Y11 illustrated in FIG. 5). In the HTTP request, the URL portion indicating the path to the static file peculiar to a web application are substituted with an identifier made of an arbitrary character string. In the communication device 10, upon receiving the HTTP request, the substituting unit 131 refers to the static file substitution list storing unit 121 and substitutes the identifier specified in the HTTP request with the URL corresponding to that identifier. Then, the communication device 10 sends the post-substitution HTTP request to the web server 3 (see an arrow Y12 illustrated in FIG. 5).

Subsequently, the web server 3 sends an HTTP response with respect to the HTTP request (see an arrow Y21 illustrated in FIG. 5). In the communication device 10, upon receiving the HTTP response, firstly, the substituting unit 131 refers to the static file substitution list storing unit 121 and substitutes the URL, which indicates the static file peculiar to the web application and specified in the HTTP response, with the identifier corresponding to that URL. Then, the substituting unit 131 outputs the post-substitution HTTP response (see an arrow Y22 illustrated in FIG. 5).

Subsequently, the obfuscation target detecting unit 132 refers to the keyword list storing unit 122 regarding the post-substitution HTTP response, and detects a character string similar to the keyword from the HTTP response. Then, the obfuscation target detecting unit 132 outputs the detection result to the obfuscation processing unit 133 (see an arrow Y23 in FIG. 5). Subsequently, the obfuscation processing unit 133 performs obfuscation with respect to the portion detected by the obfuscation target detecting unit 132. Then, the communication device 10 sends the post-obfuscation HTTP response to the client terminal 2 (see an arrow Y24 in FIG. 5). In the client terminal 2, upon receiving the HTTP response, the identifier included in the HTTP request is substituted with the URL corresponding to that identifier; the obfuscated portion of the HTTP response is decoded; and the HTTP response is displayed.

[Operations Performed by Substituting Unit]

Figure 6:
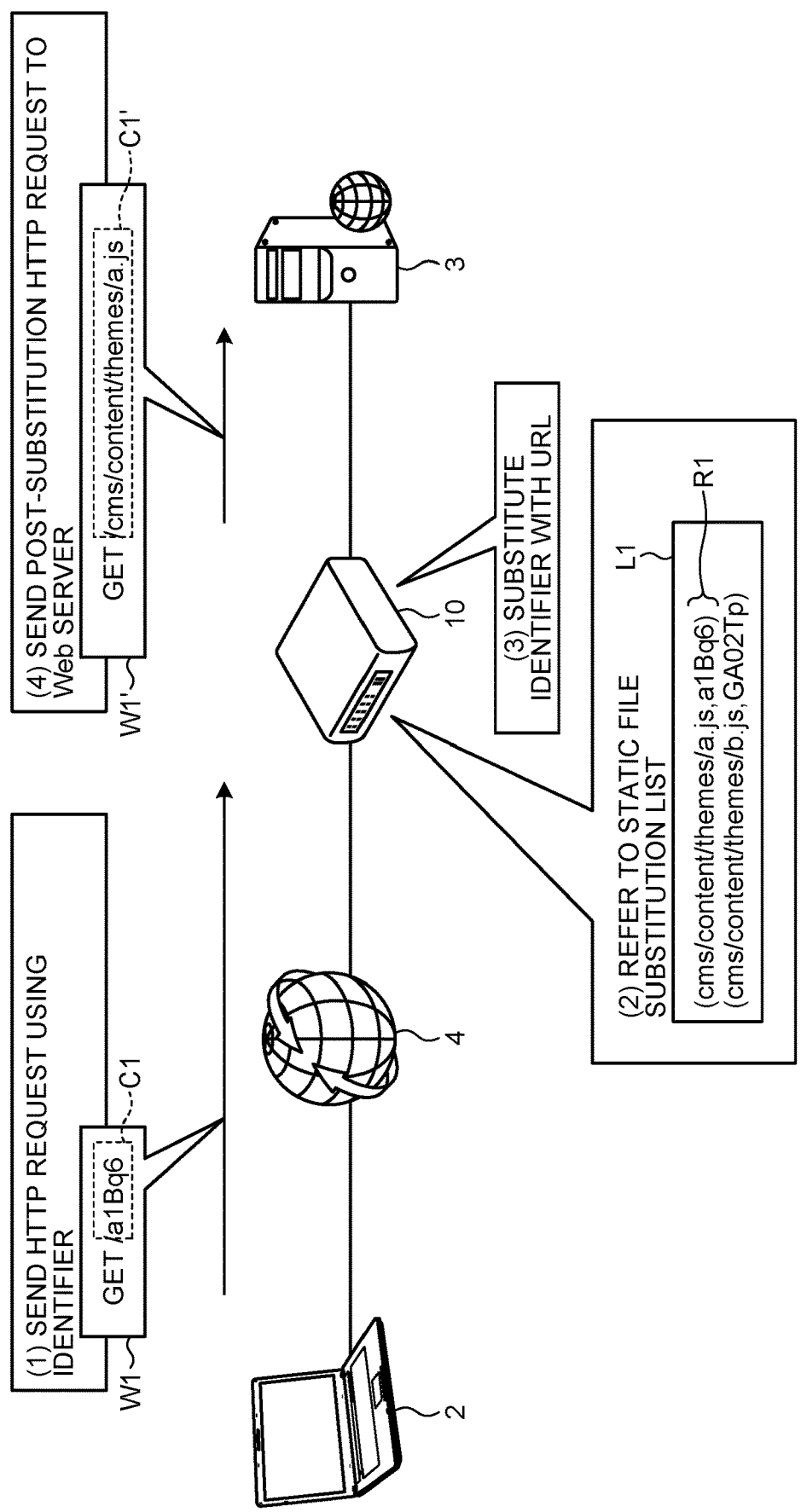
FIG. 6 is a diagram for explaining the operations performed by a substituting unit illustrated in FIG. 2.

Given below is the specific explanation of the operations performed by each constituent element of the communication device 10. To start with, the explanation is given about the operations performed by the substituting unit 131. FIG. 6 is a diagram for explaining the operations performed by the substituting unit 131 illustrated in FIG. 2. Firstly, explained below with reference to FIG. 6 are the operations performed by the substituting unit 131 in response to receiving an HTTP request.

As illustrated in FIG. 6, firstly, in the communication system 1, the client terminal 2 sends an HTTP request "GET/alBq6" using an identifier (see (1) and a box W1 in FIG. 6). At that time, of the HTTP request "GET/alBq6", the communication device 10 has substituted the requested URL with the corresponding identifier "alBq6" (see a box C1 in FIG. 6). Meanwhile, the client terminal 2 is not capable of knowing in advance the identifier that representing a random character string that is substituted.

In the communication device 10, upon receiving the HTTP request, the substituting unit 131 refers to the static file substitution list L1 stored in the static file substitution list storing unit 121 (see (2) in FIG. 6). The identifier "alBq6" specified in the HTTP request is listed in a row R1 of the static file substitution list L1. Thus, the substituting unit 131 substitutes the identifier "alBq6" specified in the HTTP request with a URL "cms/content/themes/a.js" listed in the row R1 of the static file substitution list L1 (see (3) in FIG. 6). Then, the communication device 10 sends an HTTP request "GET/cms/content/themes/a.js" (see a box W1' in FIG. 6), in which the identifier "alBq6" is substituted with the URL "cms/content/themes/a.js" (see a box C1' in FIG. 6), to the web server 3 (see (4) in FIG. 6).

Figure 7:
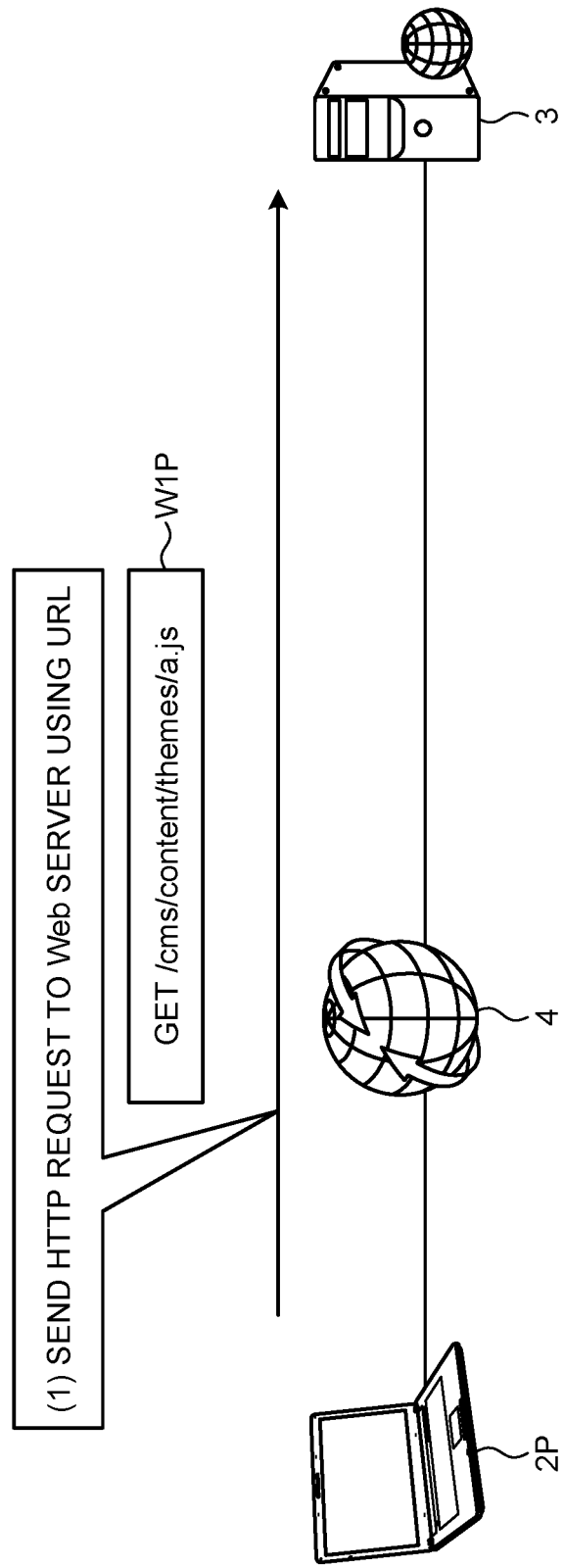
FIG. 7 is a diagram for explaining the conventional way of sending an HTTP request.

Given below is the explanation about the conventional way of sending an HTTP request. FIG. 7 is a diagram for explaining the conventional way of sending an HTTP request. Conventionally, a client terminal 2P sends the HTTP request "GET/cms/content/themes/a.js" (see a box W1P in FIG. 7), in which the URL is kept unchanged, to the web server 3 (see (1) in FIG. 7). Thus, there is a risk of WAFP-attributed disclosure of the web application information.

In contrast, in the communication device 10, based on the static file substitution list L1, the substituting unit 131 substitutes the URL in an HTTP request with the corresponding identifier, and obfuscates the web application information.

Figure 8:
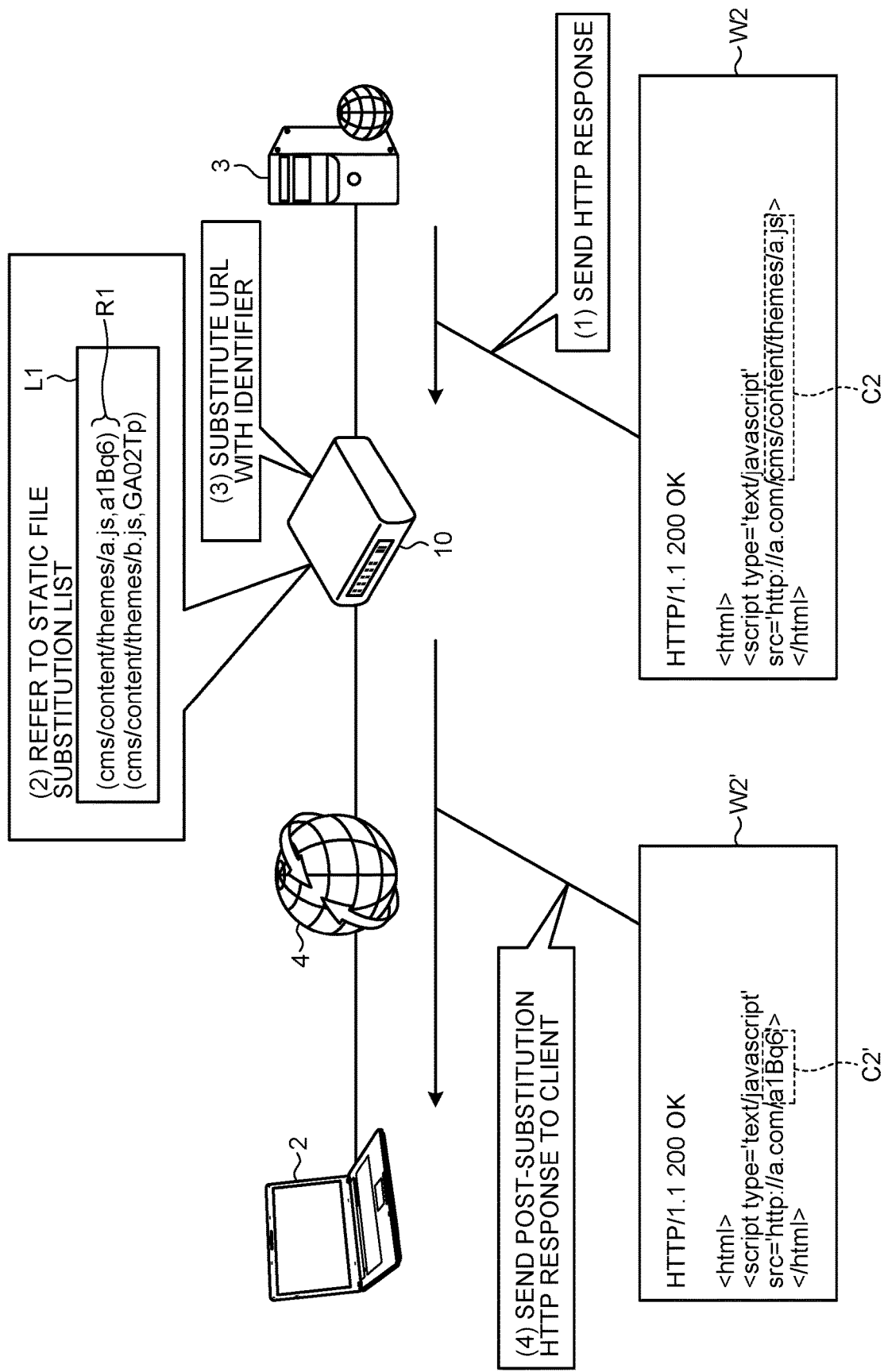
FIG. 8 is a diagram for explaining the operations performed by the substituting unit illustrated in FIG. 2.

Given below is the explanation of the operations performed by the substituting unit 131 in response to receiving an HTTP response. FIG. 8 is a diagram for explaining the operations performed by the substituting unit 131 illustrated in FIG. 2. In response to an HTTP request, the web server 3 sends an HTTP response as illustrated in a box W2 (see (1) in FIG. 8). In the communication device 10, upon receiving the HTTP response, firstly, the substituting unit 131 refers to the static file substitution list L1 (see (2) in FIG. 8) and determines whether or not the HTTP response includes a URL listed in the static file substitution list L1.

In this case, the HTTP response includes the URL "cms/content/themes/a.js" (see a box C2 in FIG. 8) listed in the row R1 of the static file substitution list L1. Hence, in the communication device 10, the substituting unit 131 substitutes the URL "cms/content/themes/a.js" with the identifier "alBq6" (see a box C2' in FIG. 8) listed in the row R1 of the static file substitution list L1 (see (3) in FIG. 8). Then, the communication device 10 sends a post-substitution HTTP response (see a box W2' in FIG. 8) to the client terminal 2 (see (4) in FIG. 8). Thus, this HTTP response is obtained as a result of the operations performed by the obfuscation target detecting unit 132 and the obfuscation processing unit 133.

Figure 9:
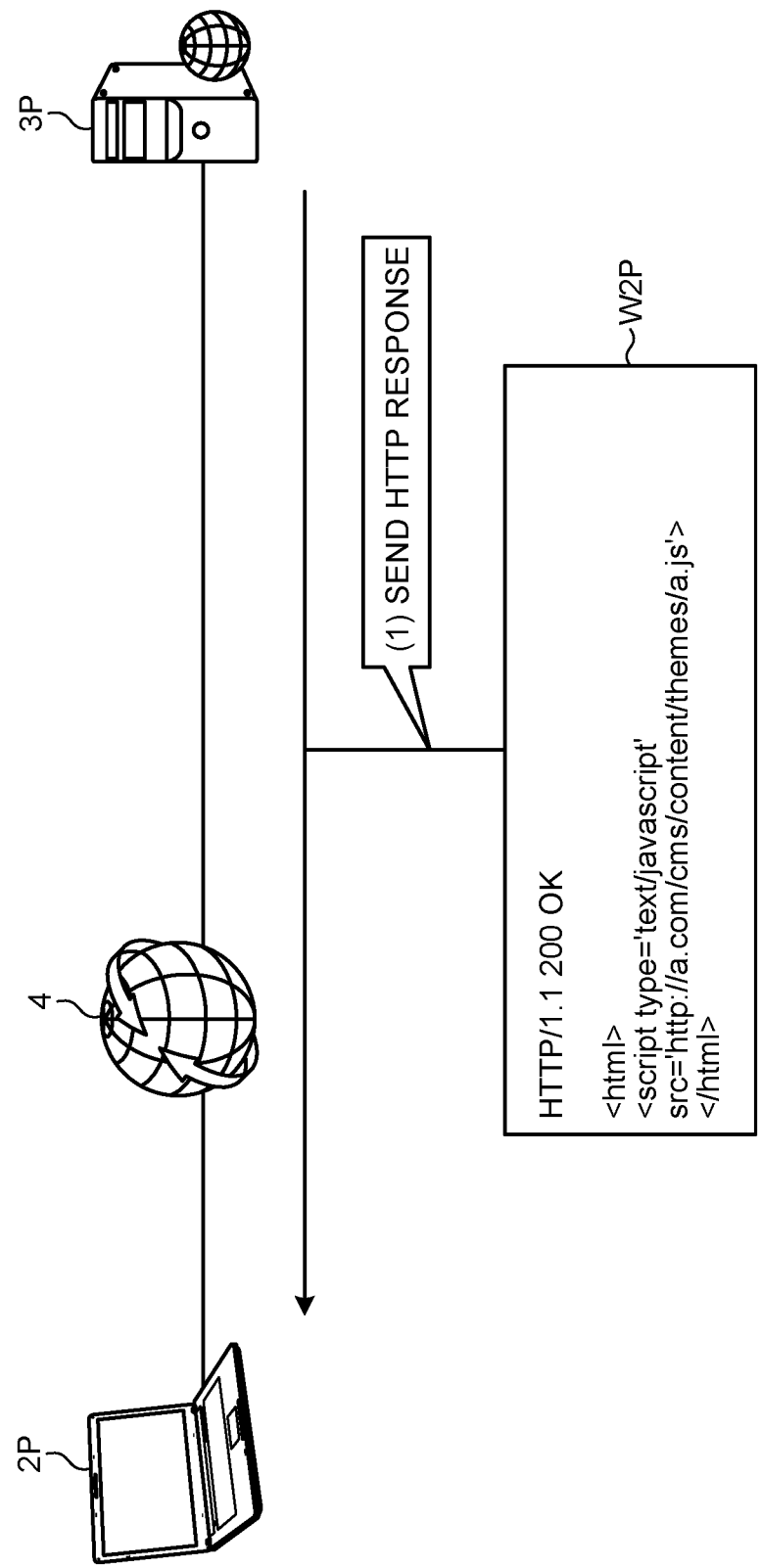
FIG. 9 is a diagram for explaining the conventional way of sending an HTTP response.

Given below is the explanation about the conventional way of sending an HTTP response. FIG. 9 is a diagram for explaining the conventional way of sending an HTTP response. Conventionally, a web server 3P sends an HTTP response (see a box W2P in FIG. 9), in which the URL is kept unchanged, to the client terminal 2 (see (1) in FIG. 9). Thus, there is a risk of WAFP-attributed disclosure if the web application information.

In contrast, in the communication device 10, based on the static file substitution list L1, the substituting unit 131 substitutes the URL in an HTTP response with the corresponding identifier, and obfuscates the web application information. In other words, in the communication device 10, based on the static file substitution list L1, the substituting unit 131 substitutes the URL specified in the HTML with the corresponding identifier; and thus obfuscates the web application information and prevents WAFP-attributed disclosure thereof.

[Operations Performed by Obfuscation Target Detecting Unit]

Given below is the explanation of the operations performed by the obfuscation target detecting unit 132. The obfuscation target detecting unit 132 detects the portion to be obfuscated in an HTTP response sent by the web server 3.

The obfuscation target detecting unit 132 refers to the keyword list L2 in the keyword list storing unit 122, and detects the portion to be obfuscated. However, the detection operation performed by the obfuscation target detecting unit 132 differs according to the content type of the HTTP request or the HTTP response. In the present embodiment, the explanation is given for an example in which obfuscation is performed with respect to the responses having the content types corresponding to four file types, namely, HTML, JavaScript (registered trademark), CSS, and image (jpg, png, and gif).

Firstly, the obfuscation target detecting unit 132 determines the content type of an HTTP request or an HTTP response. If the content type of an HTTP request or an HTTP response is determined to be JavaScript, CSS, or image; then the obfuscation target detecting unit 132 does not perform any detection and turns over the operations to the obfuscation processing unit 133.

On the other hand, when the content type is HTML, the obfuscation target detecting unit 132 detects the obfuscation target by performing the following operations. Firstly, the obfuscation target detecting unit 132 divides the HTML into tags. Then, the obfuscation target detecting unit 132 performs the following operations with respect to each tag. The obfuscation target detecting unit 132 converts the upper case alphabetical characters in the tag into lower case alphabetical characters. For example, if "Hello, World" is written inside a tag, then the obfuscation target detecting unit 132 converts that tag into "hello, world". Subsequently, with respect to each keyword listed in the keyword list, the obfuscation target detecting unit 132 extracts, from each position inside the tag, a character string having the length equal to the length of the keyword. Then, if a keyword and the extracted character string are similar, the obfuscation target detecting unit 132 detects that keyword to be the obfuscation target.

Given below is the explanation of a similarity determination operation performed by the obfuscation target detecting unit 132 for determining the similarity between a keyword and the extracted character string. In the similarity determination operation, firstly, the obfuscation target detecting unit 132 performs similarity determination about whether or not the degree of similarity between a keyword and the extracted character string is equal to or greater than a threshold value. For example, the obfuscation target detecting unit 132 calculates the degree of similarity using the Jaccard coefficient. In that case, the obfuscation target detecting unit 132 obtains the longest common subsequence (LCS) between a keyword s and an extracted character string t, and the LCS is expressed as LCS(s, t). If the length of a character string u is expressed as |u|, then the degree of similarity between the keyword s and the extracted character string t is expressed as $|LCS(s, t)|/(|s|+|t|-|LCS(s, t)|)$ using the Jaccard coefficient. Herein, if the degree of similarity is equal to or greater than a threshold value a, then the obfuscation target detecting unit 132 determines that the keyword s and the extracted character strings t are similar to each other.

For example, the explanation is given for a case in which the keyword s is "SimCMS", the character string t is "SCMS", and the threshold value a is equal to 0.6. In that case, LCS(s, t)=4 holds true, and $|LCS(s, t)|/(|s|+|t|-|LCS(s, t)|)$ becomes equal to $4/(6+4-4)=0.66$. Since $|LCS(s, t)|/(|s|+|t|-|LCS(s, t)|)$ is equal to 0.66 ($\geq \alpha(=0.6)$), the obfuscation target detecting unit 132 determines that the character string t is similar to the keyword s. The similarity calculation method based on the Jaccard coefficient is only an exemplary calculation method for calculating the degree of similarity between a keyword and a word, and the present embodiment is not limited to that method. That is, the obfuscation target detecting unit 132 can also implement some other similarity calculation method.

[Operations Performed by Obfuscation Processing Unit]

Given below is the explanation about the operations performed by the obfuscation processing unit 133. The obfuscation processing unit 133 performs obfuscation with respect to the obfuscation target in an HTTP response. The obfuscation performed by the obfuscation processing unit 133 differs according to the target content type for obfuscation. Thus, the details of the obfuscation operation are explained separately for the cases in which the target content type is HTML, JavaScript, CSS, and image (jpg, png, gif). Meanwhile, in the present embodiment, the abovementioned content types are given only as examples, and obfuscation can of course be performed for other content types too. Thus, regarding other content types too, the obfuscation processing unit 133 detects a portion in which an arbitrary character string can be embedded; writes a random character string in the portion; and performs obfuscation in an identical manner.

Firstly, the explanation is given for a case in which HTML represents the target content type for obfuscation in an HTTP response. In that case, there are three patterns regarding the scope over which the obfuscation processing unit 133 performs obfuscation. The first pattern indicates only the portion detected by the obfuscation target detecting unit 132. The second pattern indicates the entire tag that includes the portion detected by the obfuscation target detecting unit 132. The third pattern indicates the scope starting from the portion detected by the obfuscation target detecting unit 132 till the end of the tag. Thus, the scope of obfuscation varies according to the first to third patterns. However, since the processing details remain the same, the following explanation is given only about the first pattern.

For example, the obfuscation processing unit 133 implements Base64 as the encoding method. In that case, the obfuscation processing unit 133 follows the sequence explained below and performs obfuscation with respect to the portion detected by the obfuscation target detecting unit 132. Firstly, the obfuscation processing unit 133 encodes the target portion for obfuscation using Base64. Then, the obfuscation processing unit 133 embeds, in the target portion for obfuscation, a script meant for decoding the encoded character string and writing it in the HTML. At that time, depending on whether or not the target portion for obfuscation is already within the script, the decision varies about whether or not to enclose the script in "<script>".

Figure 10:
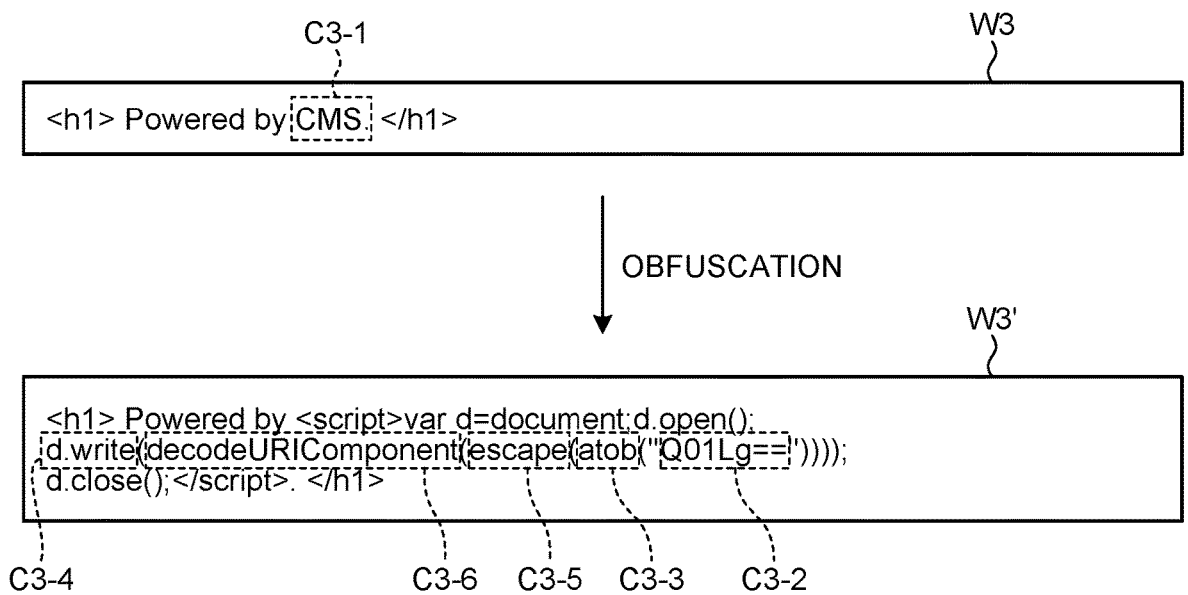
FIG. 10 is a diagram for explaining an example of the operations performed by an obfuscation processing unit illustrated in FIG. 2.

The specific explanation of the operations performed by the obfuscation processing unit 133 is given below with reference to FIG. 10. FIG. 10 is a diagram for explaining an example of the operations performed by the obfuscation processing unit 133 illustrated in FIG. 2. In FIG. 10, an example of a tag that includes a portion "CMS" (see a box C3-1) detected by the obfuscation target detecting unit 132 is illustrated in an upper box W3; and the tag obtained as a result of obfuscation performed with respect to the portion "CMS", which is detected by the obfuscation target detecting unit 132, is illustrated in a lower box W3'. Herein, the obfuscation processing unit 133 implements, for example, Base64 as the encoding method.

Firstly, the obfuscation processing unit 133 encodes "CMS" (see the box C3-1), which is detected as the obfuscation target by the obfuscation target detecting unit 132, using Base64 and sets "Q01Lg==" therein (see a box C3-2). In the HTML, in order to decode "Q01Lg==" and then display it, the obfuscation processing unit 133 uses the existing Base64 decode library "atob" (see a box C3-3). In order to embed the decoding result in the HTML, the obfuscation processing unit 133 uses "document.write" (see a box C3-4). Moreover, in order to ensure compatibility even when the decoded character string is in some other language than English, the obfuscation processing unit 133 encodes the decoded character string into "utf-8" using "escape" (see a box C3-5). Then, the obfuscation processing unit 133 restores the encoded character string to the original character string using "decodeURIComponent" (see a box C3-6).

Meanwhile, this method for performing obfuscation in the HTML is only exemplary, and the obfuscation processing unit 133 can alternatively implement some other obfuscation method.

Given below is the explanation of a case in which JavaScript represents the target content type for obfuscation in an HTTP response. For example, the obfuscation processing unit 133 implements Base64 as the encoding method. Then, the obfuscation processing unit 133 follows the sequence explained below and performs obfuscation in JavaScript. Firstly, the obfuscation processing unit 133 encodes the entire JavaScript using Base64. Then, the obfuscation processing unit 133 embeds, in the target portion for obfuscation, a script meant for decoding the encoded character string and evaluating it.

Figure 11:
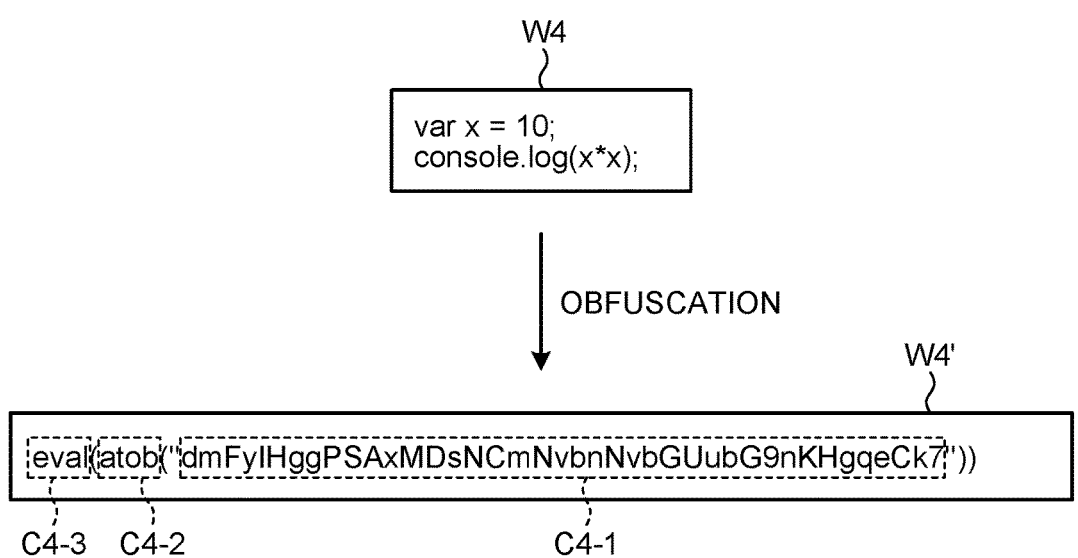
FIG. 11 is a diagram for explaining an example of the operations performed by the obfuscation processing unit illustrated in FIG. 2.

The specific explanation of the operations performed by the obfuscation processing unit 133 is given below with reference to FIG. 11. FIG. 11 is a diagram for explaining an example of the operations performed by the obfuscation processing unit 133 illustrated in FIG. 2. In FIG. 11, an example of JavaScript to be obfuscated is illustrated in an upper box W4; and the post-obfuscation JavaScript is illustrated in a lower box W4'. The obfuscation processing unit 133 implements, for example, Base64 as the encoding method.

Firstly, using Base64, the obfuscation processing unit 133 encodes "var x=10; console.log (x*x);" that is written in the box W4 to be obfuscated; and sets "dmFyIHggPSAxMDsNCmNvbnNvbGUubG9nKHgqe Ck7" therein (see a box C4-1). In order to decode the encoded portion, the obfuscation processing unit 133 uses the existing Base64 decode library "atob" (see a box C4-2). Moreover, in order to execute the JavaScript that is decoded using "atob" and that is expressed as a character string, the obfuscation processing unit 133 uses the eval function (see a box C4-3). The eval function executes the JavaScript that is expressed as a character string. For example, 'eval("1+1")' returns "2".

Meanwhile, this method for performing obfuscation in JavaScript is only exemplary, and the obfuscation processing unit 133 can alternatively implement some other obfuscation method.

Given below is the explanation of a case in which CSS represents the target content type for obfuscation in an HTTP response. For example, the obfuscation processing unit 133 implements Base64 as the encoding method. Herein, the operations vary depending on whether the CSS is embedded with a style tag in the HTML or whether the CSS is called as an external file.

Figure 12:
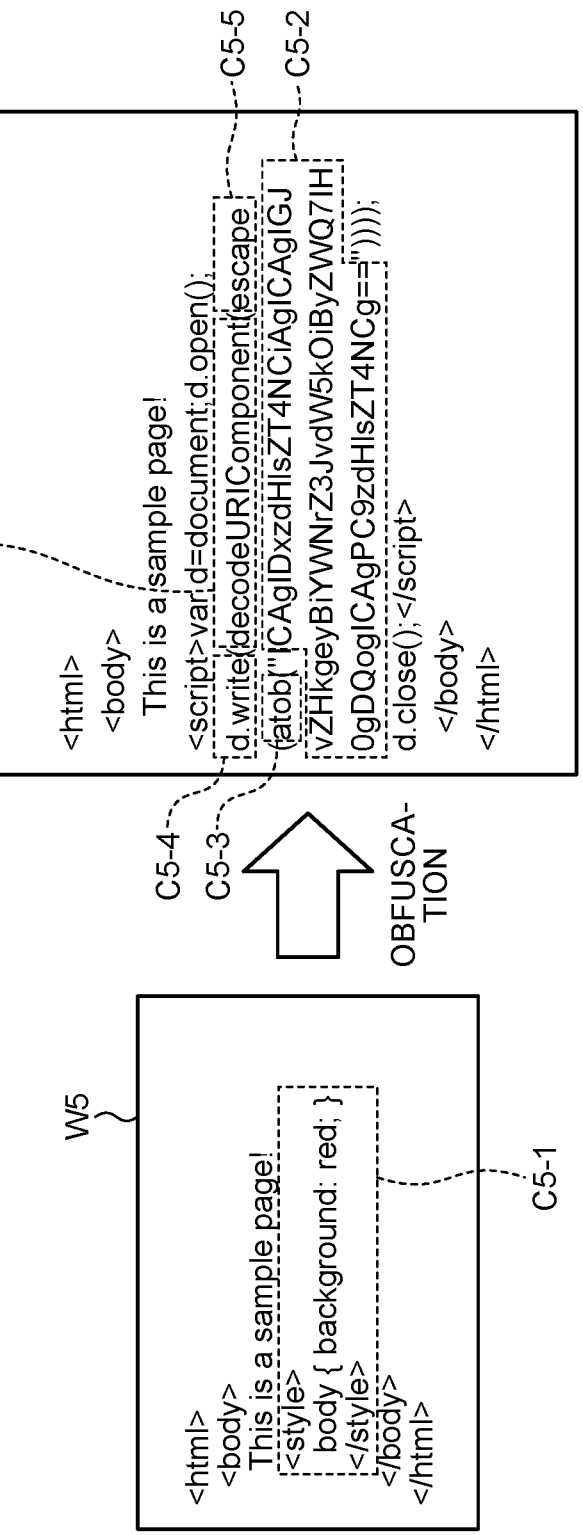
FIG. 12 is a diagram for explaining an example of the operations performed by the obfuscation processing unit illustrated in FIG. 2.

Firstly, explained below with reference to FIG. 12 is a case in which the CSS is embedded with a style tag in HTML. FIG. 12 is a diagram for explaining an example of the operations performed by the obfuscation processing unit 133 illustrated in FIG. 2. In FIG. 12, an example of the main part of the HTTP response to be obfuscated is illustrated in a left-side box W5; and an example of the main part of the post-obfuscation HTTP response is illustrated in a right-side box W5'.

The obfuscation processing unit 133 encodes the entire style tag (see a box C5-1), which is the target for obfuscation in the box W5, using Base64. Then, the obfuscation processing unit 133 embeds, in the target portion for obfuscation, a script meant for decoding the encoded character string and writing it in the HTML (see boxes C5-2 to C5-6 in the box W5'). More specifically, the obfuscation processing unit 133 applies the "atob" function, which is meant for decoding, to "ICAgIDxzdHlsZT4NCiAgICAgIGJvZHkgeyBiYWNrZ3J vdW5kOiByZWQ7IH0gDQogICAgPC9zdHlsZT4NCg==" (see the box C5-2) that is obtained by encoding the style tag in the box C5-1 using Base64; and then embeds the decoded result in the HTML using the "document.write" function (see the box C5-4). Then, the obfuscation processing unit 133 embeds "escape" (see the box C5-5), which is meant for encoding the decoded character string, and "decodeURIComponent" (see the box C5-6), which is meant for restoring the original character string, in the HTML.

Figure 13:
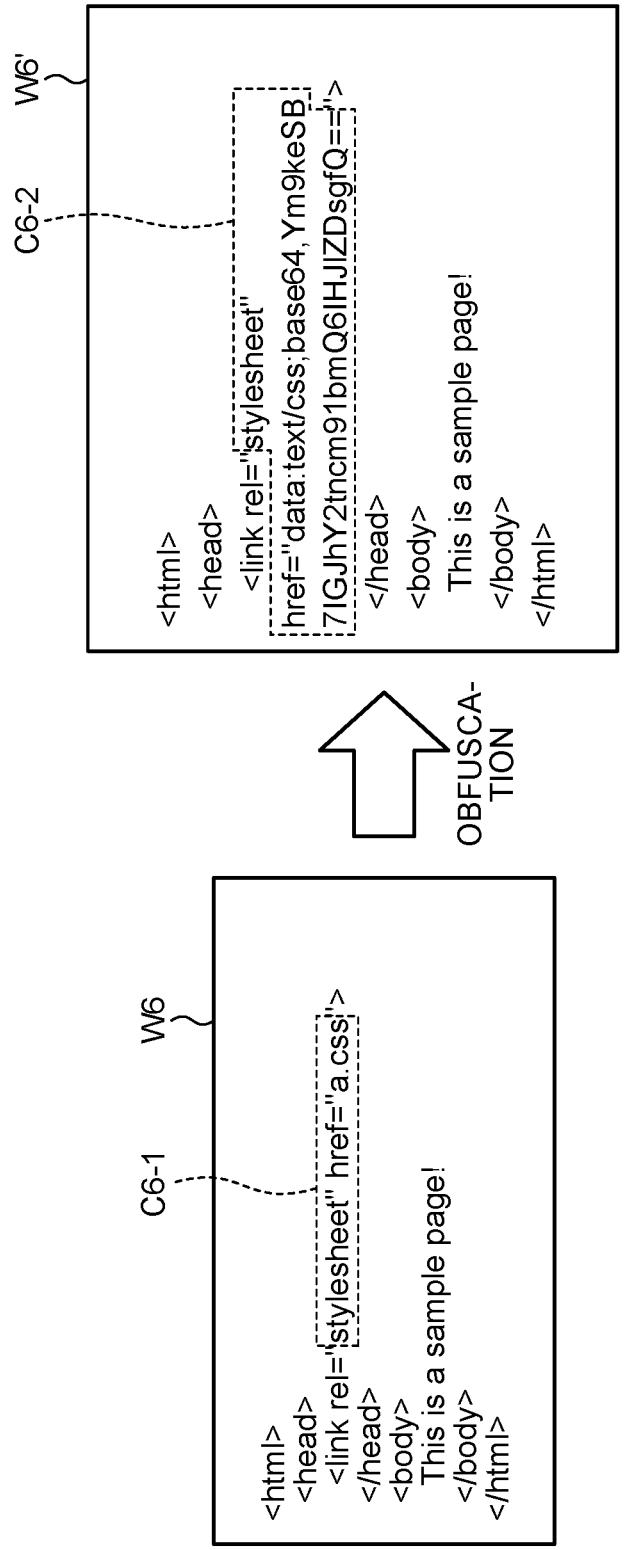
FIG. 13 is a diagram for explaining an example of the operations performed by the obfuscation processing unit illustrated in FIG. 2.

Explained below with reference to FIG. 13 is a case in which the CSS is called as an external file. FIG. 13 is a diagram for explaining an example of the operations performed by the obfuscation processing unit 133 illustrated in FIG. 2. In FIG. 13, an example of the main part of the HTTP response to be obfuscated is illustrated in a left-side box W6; and an example of the main part of the post-obfuscation HTTP response is illustrated in a right-side box W6'.

The obfuscation processing unit 133 encodes, using Base64, the entire portion that indicates the external file. Then, the obfuscation processing unit 133 substitutes the portion meant for calling the external value with the value obtained as a result of encoding (see a box C6-2 in the box W6'). More specifically, the obfuscation processing unit 133 encodes, using Base64, the entire location 'stylesheet" href="a.css' (see a box C6-1). Then, the obfuscation processing unit 133 substitutes the portion meant for calling the external file with a value 'stylesheet" href="data:text/css;base64,Ym9keSB7IGJhY2tncm91bmQ6IHJlZDsgfQ==' (see the box C6-2 in the box W6').

Meanwhile, this method for performing obfuscation in CSS is only exemplary, and the obfuscation processing unit 133 can alternatively implement some other obfuscation method.

Given below is the explanation of a case in which an image (a jpg file, a png file, or a gif file) represents the target content type for obfuscation in an HTTP response. An image has a portion for embedding a comment. The obfuscation processing unit 133 embeds a random character string in such a portion. As a result, even if the hash value of the image is compared using WAFP, it becomes possible to return a different hash value and thus prevent WAFP-attributed disclosure of the web application information.

In this case, the obfuscation processing unit 133 adds a comment in the image using a known tool. More particularly, if "exiftool" is selected as the tool to be used, then the obfuscation processing unit 133 executes a command "exiftool-comment=vV12ca5 sample.jpg". Of that command, "vV12ca5" is a randomly-generated comment. The addition of the comment "vV12ca5" results in a change in the hash value.

First Working Example

Figure 14:
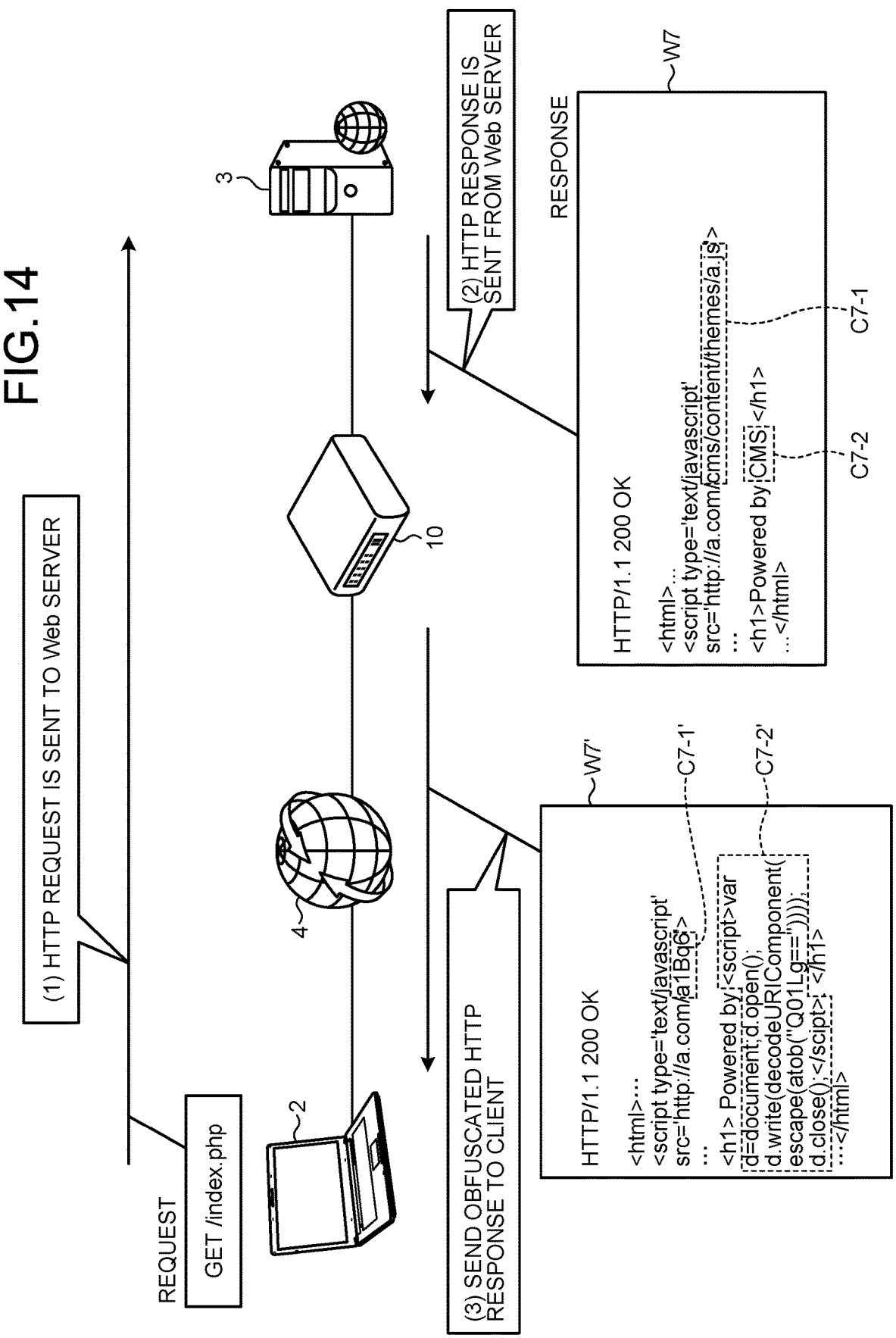
FIG. 14 is a diagram for explaining an example of the communication performed in the communication system illustrated in FIG. 1.

Explained below with reference to FIG. 14 is an example of the communication performed in the communication system 1. FIG. 14 is a diagram for explaining an example of the communication performed in the communication system 1 illustrated in FIG. 1.

Firstly, the explanation is given about a case in which an HTTP request "GET/index.php" is sent to the web server 3 (see (1) in FIG. 14). Upon receiving the HTTP request, the web server 3 sends an HTTP response (see a box W7) with respect to the HTTP request (see (2) in FIG. 14). Then, the communication device 10 sends, to the client terminal 2, an HTTP response (see a box W7') that is obtained as a result of performing obfuscation with respect to the received HTTP response (see (3) in FIG. 14).

In this case, in the communication device 10, the URL "cms/content/themes/a.js" that is listed in the static file substitution list L1 (refer to the first row in FIG. 3) is illustrated in a box C7-1 in the HTTP response. Hence, the substituting unit 131 substitutes the URL "cms/content/themes/a.js" with the corresponding identifier "alBq6" and embeds it in the HTTP request (see a box C7-1'). Moreover, in the communication device 10, since "CMS" detected by the obfuscation target detecting unit 132 is specified in a box C7-2 in the HTTP response, the obfuscation processing unit 133 embeds, in the HTTP request, "<script>var d=document;d.open( );d.write(decodeURIComponent(escape(atob("Q01Lg=="))));d.close( );</scipt>" that is obtained as a result of obfuscating "CMS" using Base64 as explained earlier with reference to FIG. 10 (see a box C7-2').

Second Working Example

Figure 15:
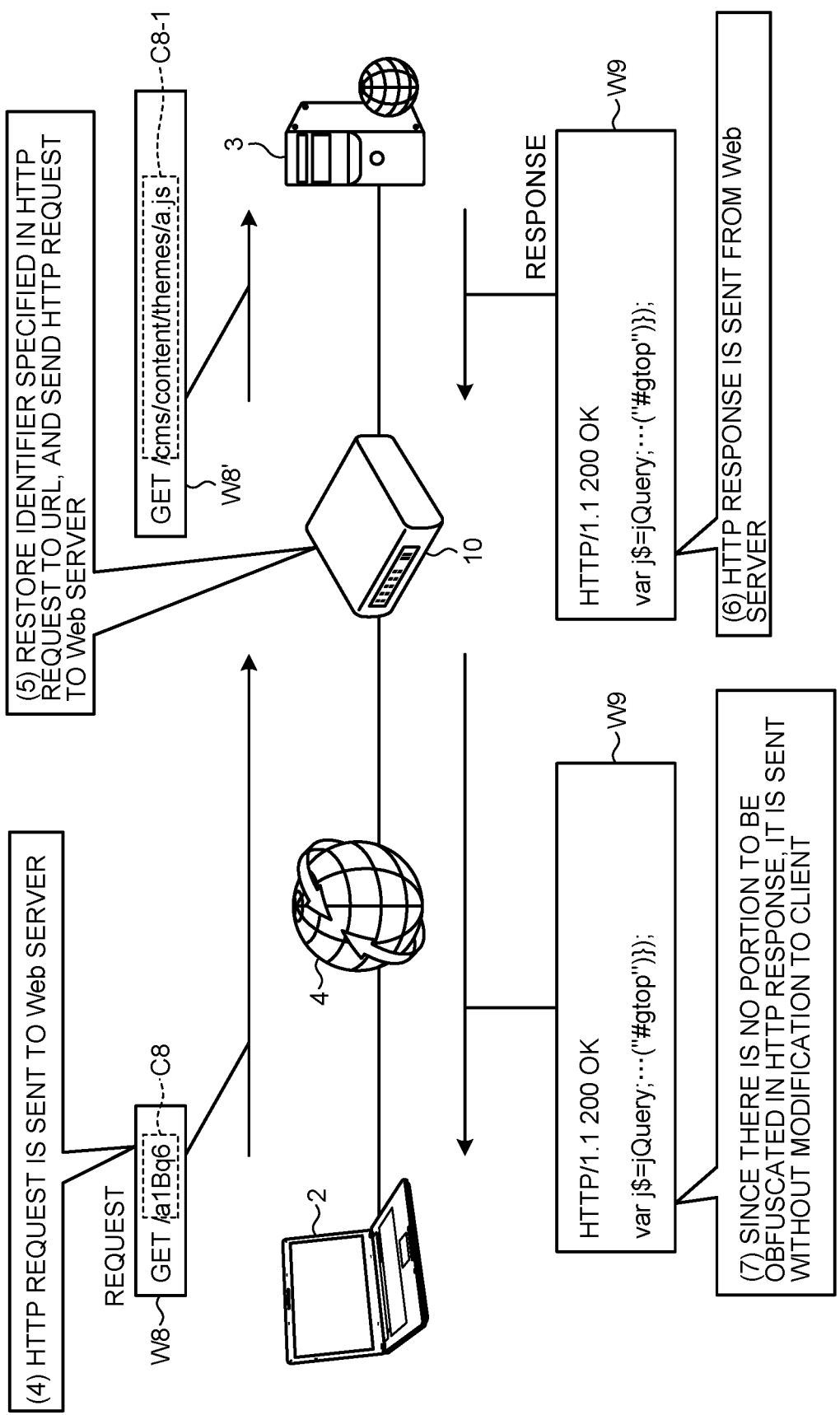
FIG. 15 is a diagram for explaining another example of the communication performed in the communication system illustrated in FIG. 1.

Explained below with reference to FIG. 15 is another example of the communication performed in the communication system 1. FIG. 15 is a diagram for explaining another example of the communication performed in the communication system 1 illustrated in FIG. 1.

Firstly, the explanation is given about a case in which an HTTP request "GET/alBq6" (see a box W8) is sent from the client terminal 2 to the web server 3 (see (4) in FIG. 15). The HTTP request sent by the client terminal 2 is formed by substituting the URL portion with the identifier "alBq6" corresponding to the URL (see a box C8). Upon receiving the HTTP request, the communication device 10 refers to the static file substitution list L1 and sends, to the web server 3 (see (5) in FIG. 15), the HTTP request in which the identifier "alBq6" is restored to the URL "cms/content/themes/a.js" (see a box C8-1).

Then, an HTTP response (see a box W9) with respect to the HTTP request is sent from the web server 3 to the communication device 10 (see (6) in FIG. 15). In that case, since there is no portion to be obfuscated in the HTTP response, the HTTP response is sent without modification from the communication device 10 to the client terminal 2 (see (7) in FIG. 15).

[Operations Performed in Communication Device with Respect to HTTP Request]

Figure 16:
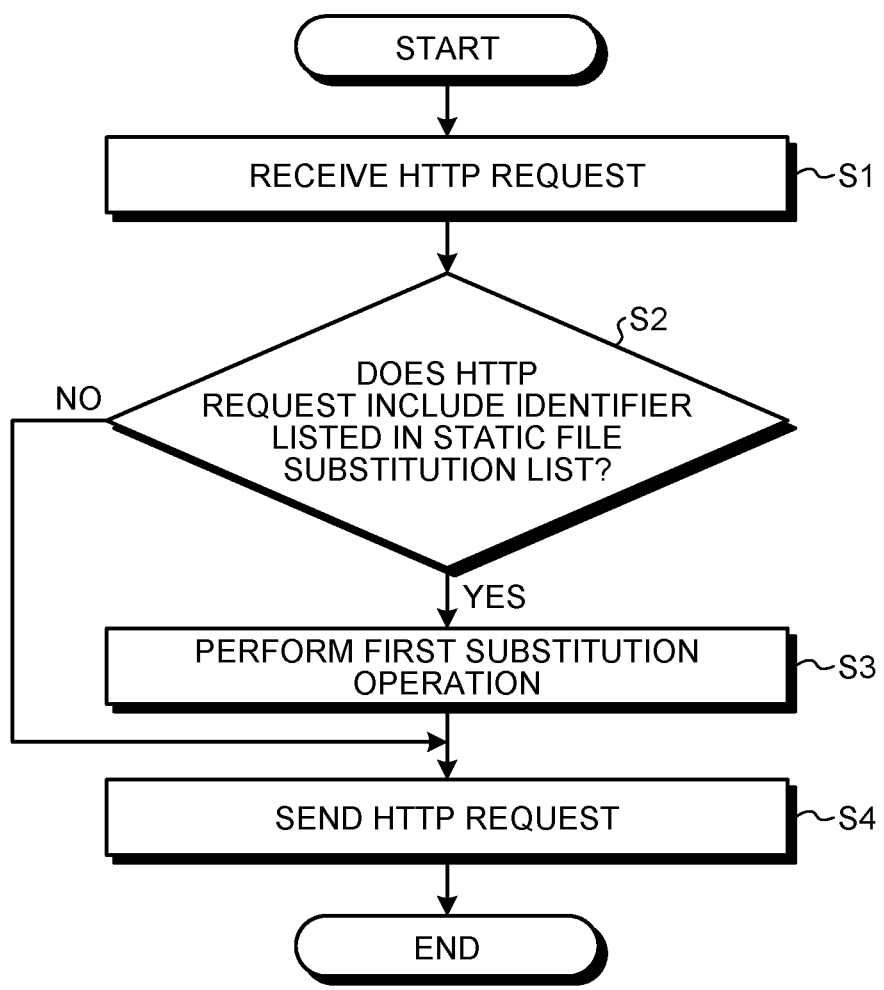
FIG. 16 is a flowchart for explaining a sequence of operations performed in the communication device, which is illustrated in FIG. 2, with respect to an HTTP request.

Explained below with reference to FIG. 16 is a sequence of operations performed in the communication device 10 with respect to an HTTP request. FIG. 16 is a flowchart for explaining a sequence of operations performed in the communication device 10, which is illustrated in FIG. 2, with respect to an HTTP request.

As illustrated in FIG. 16, in the communication device 10, when an HTTP request is received (Step S1), the substituting unit 131 refers to the static file substitution list storing unit 121 and determines whether or not an identifier listed in the static file substitution list L1 is specified in the HTTP request (Step S2). If it is determined that an identifier listed in the static file substitution list L1 is specified in the HTTP request (Yes at Step S2), then the substituting unit 131 performs a first substitution operation for substituting that identifier with the corresponding URL (Step S3). On the other hand, if it is determined that an identifier listed in the static file substitution list L1 is not specified in the HTTP request (No at Step S2) or after the operation at Step S3 is completed, the communication device 10 sends the HTTP request to the web server 3 (Step S4), and it marks the end of the operations.

[Operations Performed by Communication Device with Respect to HTTP Response]

Figure 17:
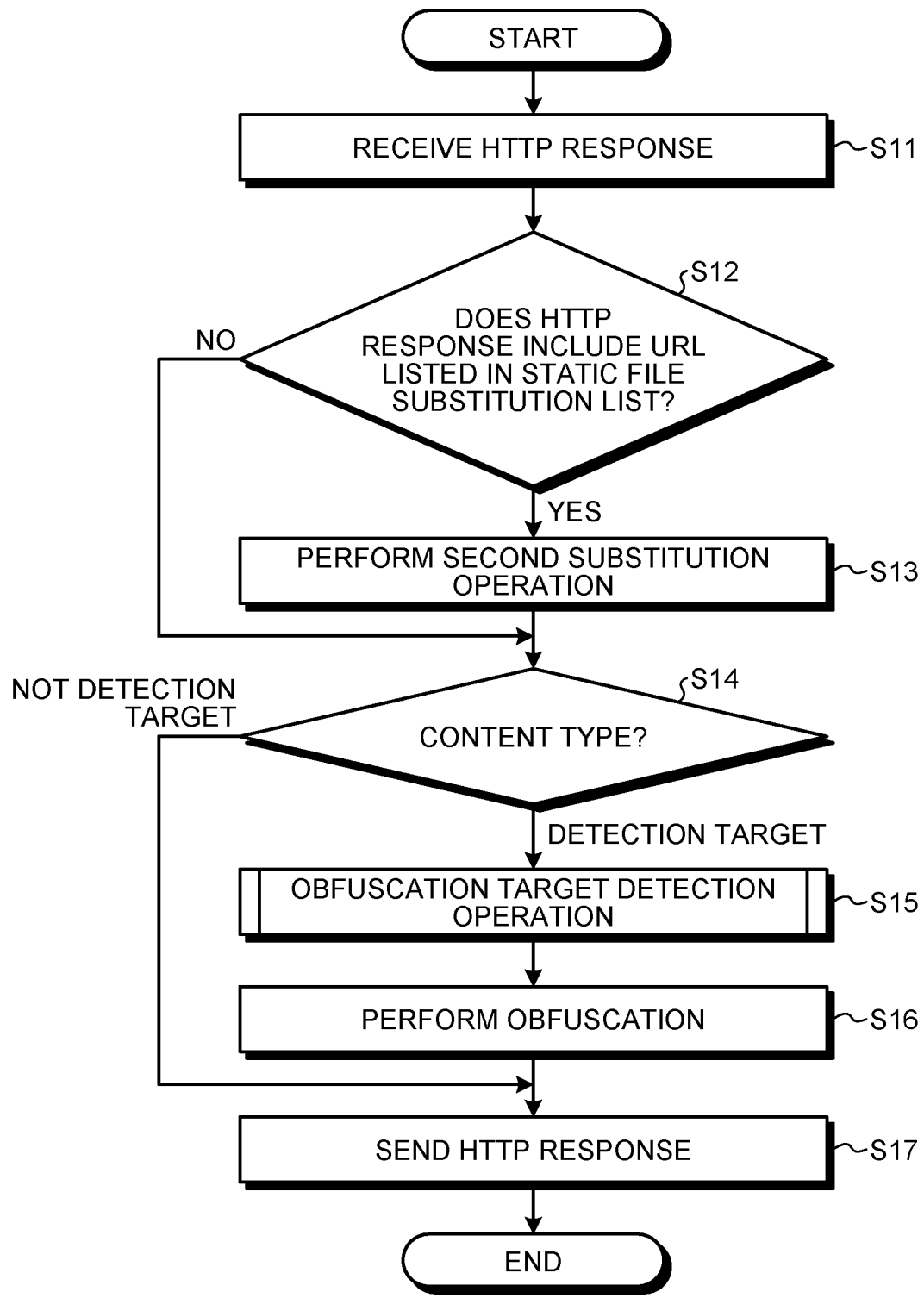
FIG. 17 is a flowchart for explaining a sequence of operations performed by the communication device, which is illustrated in FIG. 2, with respect to an HTTP response.

Explained below with reference to FIG. 17 is a sequence of operations performed by the communication device 10 with respect to an HTTP response. FIG. 17 is a flowchart for explaining a sequence of operations performed by the communication device 10, which is illustrated in FIG. 2, with respect to an HTTP response.

As illustrated in FIG. 17, when the communication device 10 receives an HTTP response (Step S11), the substituting unit 131 refers to the static file substitution list storing unit 121 and determines whether or not a URL listed in the static file substitution list L1 is included in the HTTP response (Step S12). If it is determined that a URL listed in the static file substitution list L1 is included in the HTTP response (Yes at Step S12), then the substituting unit 131 performs a second substitution operation for substituting that URL with the corresponding identifier (Step S13).

On the other hand, if it is determined that a URL listed in the static file substitution list L1 is not included in the HTTP response (No at Step S12) or after the operation at Step S13 is completed, the obfuscation target detecting unit 132 determines whether or not the content type of the HTTP response is the target content type for detection as the obfuscation target (Step S14). For example, as described above, if the content type of the HTTP response is neither JavaScript, nor CSS, nor image; then the obfuscation target detecting unit determines that the HTTP response is not an obfuscation target (not detection target at Step S14) and does not perform the obfuscation target detection operation. Then, the system control proceeds to Step S17.

On the other hand, for example, as described above, when the content type of the HTTP response is HTML, the obfuscation target detecting unit 132 determines that the HTTP response is an obfuscation target (detection target at Step S14), and performs the obfuscation target detection operation (Step S15).

Subsequently, the obfuscation processing unit 133 implements the method according to the content type of the HTTP response, and performs obfuscation with respect to the portion in which information related to the web application is specified in the HTTP response (Step S16).

For example, when the content type of the HTTP response is HTML, the obfuscation processing unit 133 substitutes the character string that is detected by the obfuscation target detecting unit 132 and that corresponds to the information related to a web application with the character string obtained as a result of obfuscation. Alternatively, for example, when the content type of the HTTP response is JavaScript, the obfuscation processing unit 133 encodes the entire JavaScript using Base64 and embeds a script meant for decoding the encoded character string and evaluating it.

Still alternatively, for example, when the content type of the HTTP response is CSS, the obfuscation processing unit 133 encodes, using Base64, either the entire Style tag in which the CSS is embedded or, if the CSS is called as an external file, the portion in which the external file is called; and embeds a script meant for decoding the encoded character string and writing it in HTML. Still alternatively, for example, when the content type of the HTTP response is image, the obfuscation processing unit 133 embeds an arbitrary random character string in the comment of the image.

Then, the communicating unit 11 of the communication device 10 sends the post-obfuscation HTTP response to the client terminal 2 (Step S17). It marks the end of the operations.

[Sequence of Operations Performed in Obfuscation Target Detection]

Figure 18:
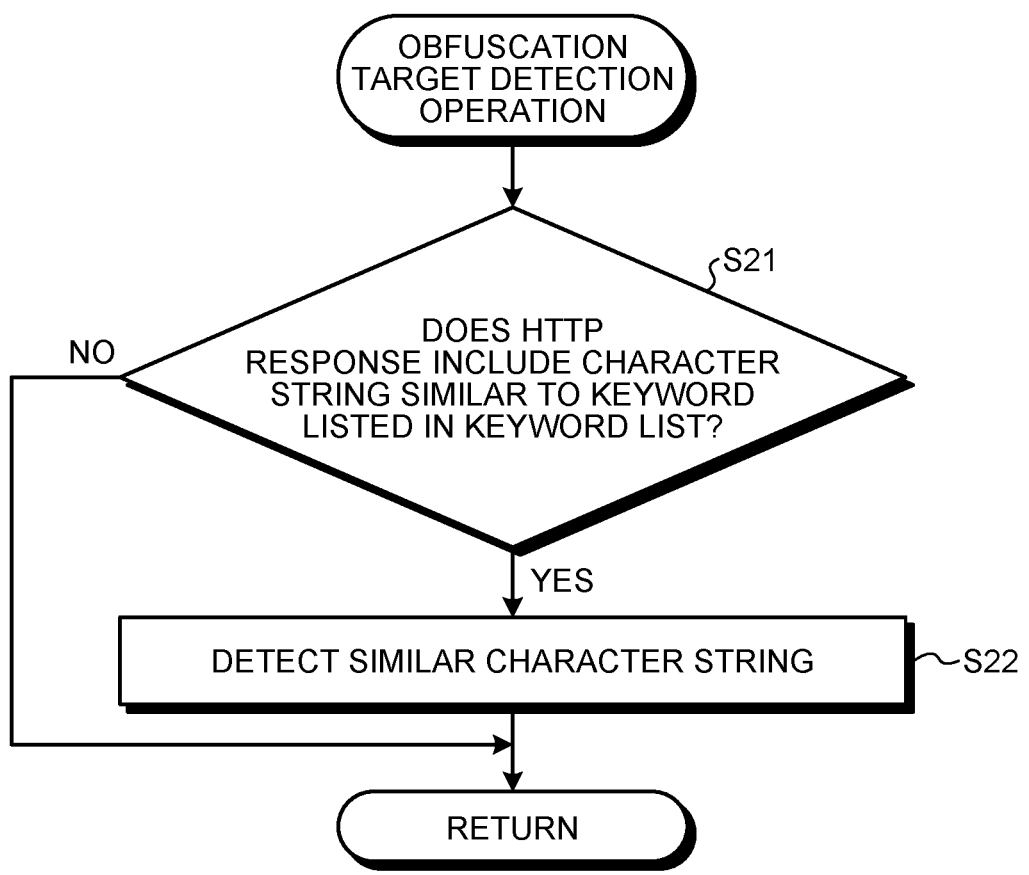
FIG. 18 is a flowchart for explaining a sequence of operations performed in the obfuscation target detection operation illustrated in FIG. 17.

Explained below with reference to FIG. 18 is a sequence of operations performed in the obfuscation target detection operation (Step S15) illustrated in FIG. 17. FIG. 18 is a flowchart for explaining a sequence of operations performed in the obfuscation target detection operation illustrated in FIG. 17.

As illustrated in FIG. 18, the obfuscation target detecting unit 132 refers to the keyword list storing unit 122; performs similarity determination between the character string included in the HTTP response and the keywords of the keyword list; and determines whether or not the HTTP response includes a character string similar to a keyword listed in the keyword list (Step S21). If it is determined that the HTTP response includes a character string similar to a keyword listed in the keyword list (Yes at Step S21), then the obfuscation target detecting unit 132 detects the similar character strings (Step S22). On the other hand, if it is determined that the HTTP response does not include a character string similar to a keyword listed in the keyword list (No at Step S22) or after the operation at Step S22 is completed, then the obfuscation target detecting unit 132 ends the obfuscation target detection operation.

Effects of Embodiment

In this way, in the present embodiment, the communication device 10 that is installed as a proxy of the web server 3 performs obfuscation with respect to the information related to web applications, from among the information communicated between the web server 3, and sends the communication including the obfuscated information to the destination. Thus, according to the present embodiment, the communication device 10 relays the communication between the web server 3 and the client terminal 2, and at the same time alters web-application-related information from among the information included in the communication, without altering the actual web applications. As a result, according to the present embodiment, since the actual web applications are not altered, only the web-application-related information is obfuscated without altering the display or the functions in the web browser, thereby enabling prevention of WAFP-attributed disclosed of web application information.

Moreover, in the communication device, obfuscation with respect to the portion including the web-application-related information is performed using the method set according to the content type of the HTTP response sent from the web server 3. As a result, appropriate obfuscation is performed according to each content type.

Furthermore, in the communication device 10, if an HTTP response sent from the web server 3 is HTML, the keyword list indicating the keywords made of peculiar character strings of web applications is referred to and such a character string in the HTTP response which is similar to a keyword is detected as the information related to the web application. Then, the communication device 10 substitutes the detected character string with an arbitrary character string, and performs appropriate obfuscation so that the information about the web application does not easily get disclosed.

Moreover, in the communication device 10, when the content type of an HTTP response is image, an arbitrary random character string is embedded in the comment of the image and thus the hash value is changed. According to the present embodiment, even when the content type of an HTTP response is image, it is possible to prevent WAFP-attributed disclosure of web application information.

In the present embodiment, the communication device 10 has pairs of URLs, which indicate the paths to the static files peculiar to web applications, and identifiers, which correspond to the URLs and which are made of arbitrary character strings, stored therein. Then, regarding an HTTP request sent from the client terminal 2, the communication device 10 substitutes the identifier included in the HTTP request with the URL corresponding to the identifier, and sends the HTTP request to the web server 3. Hence, in the communication system 1, the URL is prevented from being disclosed over the network, and the HTTP request indicating the requested URL is sent to the web server 3 thereby enabling appropriate communication.

Then, in the present embodiment, the communication device 10 substitutes the URL, which indicates the path to the static file peculiar to the web application included in the HTTP response sent from the web server 3, with the identifier corresponding to the URL. As a result, in the communication system 1, an HTTP response that is processed to prevent disclosure of URLs over the network is sent to the client terminal 2. That enables prevention of WAFP-attributed disclosure of the web application information.

Hence, according to the present embodiment, the communication device 10 that serves as a proxy of the web server 3 performs detailed examination of the communication between the client terminal 2 and the web server 3, and obfuscates the information related to web applications. Hence, without having to alter the display and the functions of the web browser, obfuscation is performed in such a way that the web application information is not easily disclosed.

[System Configuration]

The constituent elements of the device illustrated in the drawings are merely conceptual, and need not be physically configured as illustrated. The constituent elements, as a whole or in part, can be separated or integrated either functionally or physically based on various types of loads or use conditions. The process functions performed by the device are entirely or partially implemented by the CPU or computer programs that are analyzed and executed by the CPU, or implemented as hardware by wired logic.

Of the processes described in the embodiments, all or part of the processes explained as being performed automatically can be performed manually. Similarly, all or part of the processes explained as being performed manually can be performed automatically by a known method. The processing procedures, the control procedures, specific names, various data, and information including parameters described in the embodiments or illustrated in the drawings can be changed as required unless otherwise specified.

[Program]

Figure 19:
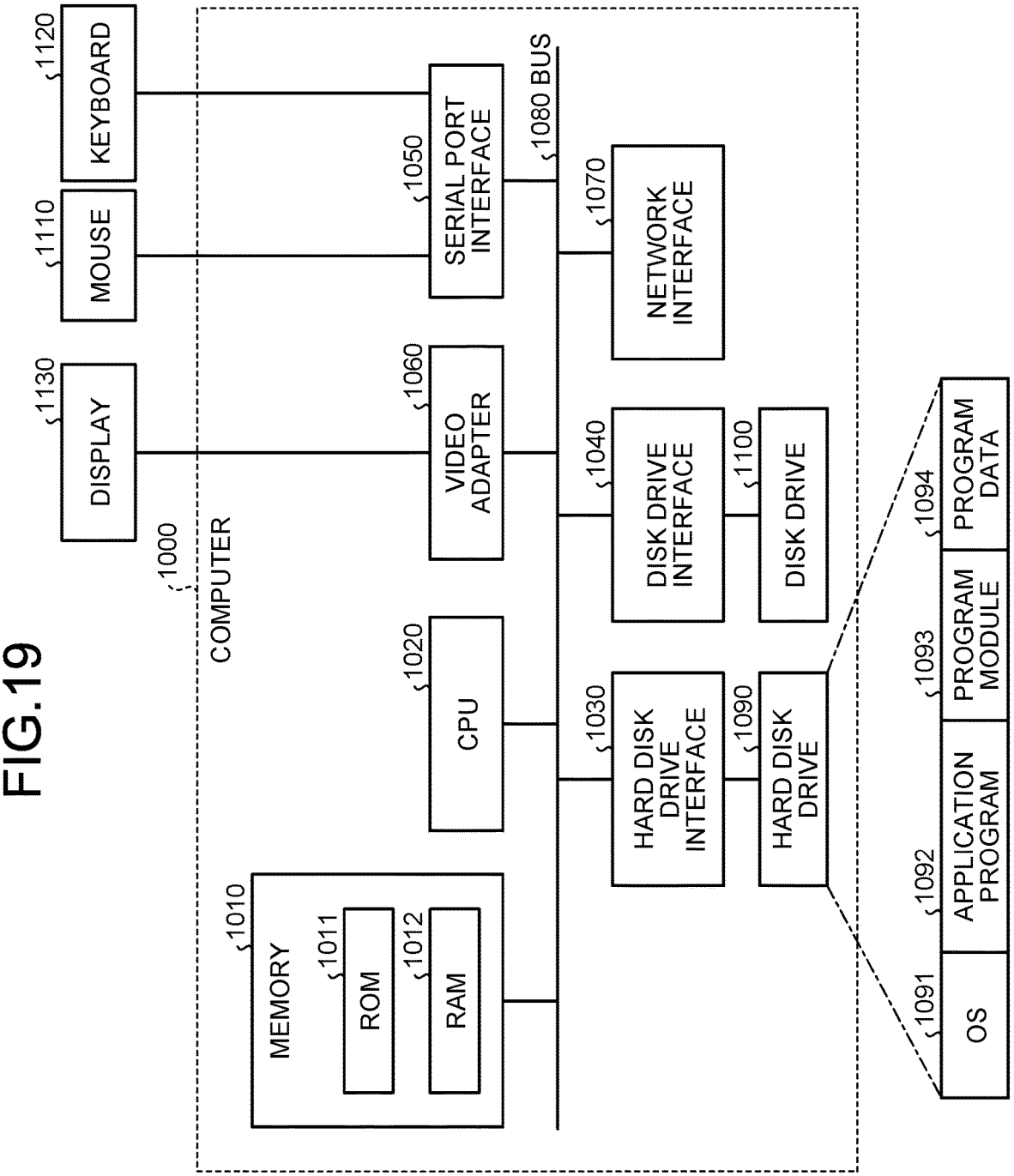
FIG. 19 is a diagram illustrating an example of a computer that executes a program and implements the communication device.
Figure 20:
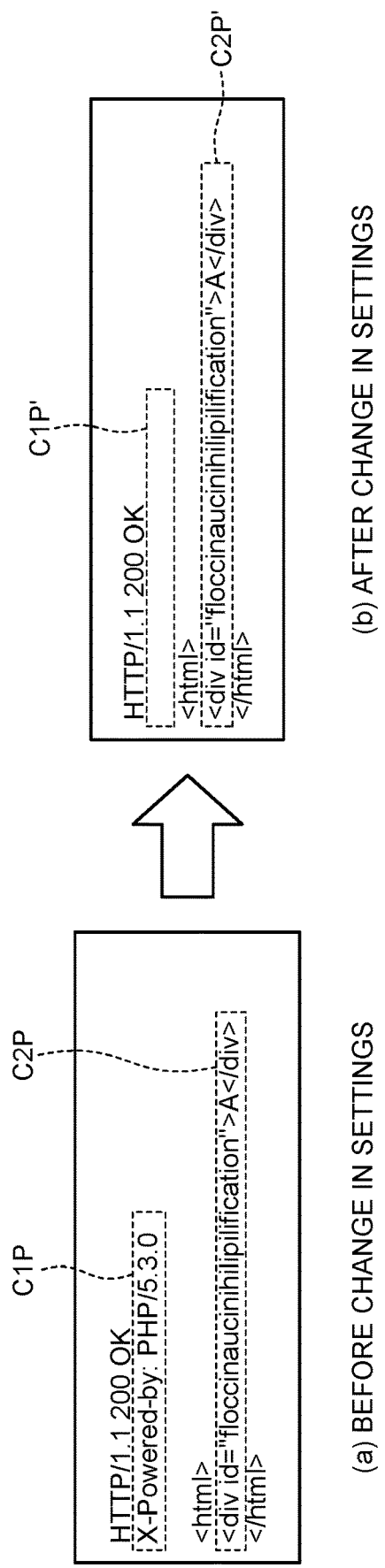
FIG. 20 is a diagram for explaining a conventional countermeasure technology against WAFP.
Figure 21:
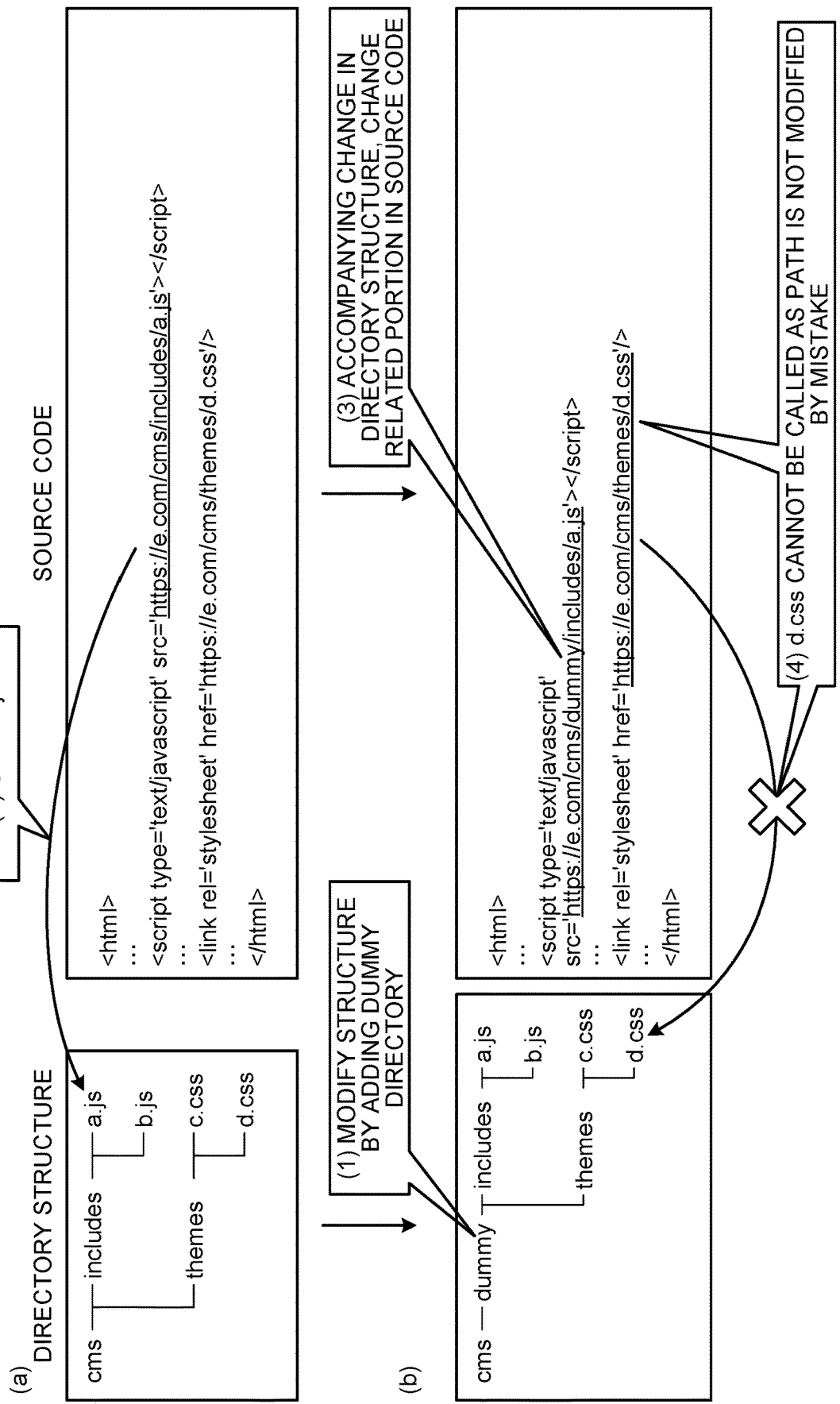
FIG. 21 is a diagram for explaining a conventional countermeasure technology against WAFP.

FIG. 19 is a diagram illustrating an example of a computer that executes a program and implements the communication device 10. For example, a computer 1000 includes a memory 1010 and a CPU 1020. Moreover, the computer 1000 includes a hard disk drive interface 1030, a disk drive interface 1040, a serial port interface 1050, a video adapter 1060, and a network interface 1070. Moreover, these constituent elements are connected to each other by a bus 1080.

The memory 1010 includes a ROM (Read Only Memory) 1011 and a RAM 1012. For example, the ROM 1011 is used to store a boot program such as the BIOS (Basic Input Output System). The hard disk drive interface 1030 is connected to a hard disk drive 1090. The disk drive interface 1040 is connected to a disk drive 1100. For example, a detachably-attachable memory medium such as a magnetic disk or an optical disk is inserted in the disk drive 1100. The serial port interface 1050 is connected to, for example, a mouse 1110 and a keyboard 1120. The video adapter 1060 is connected to, for example, a display 1130.

The hard disk drive 1090 is used to store, for example, an OS (Operating System) 1091, an application program 1092, a program module 1093, and program data 1094. That is, the program for defining the operations of the communication device 10 is implemented as the program module 1093 in which a computer-executable code is written. The program module 1093 is stored in, for example, the hard disk drive 1090. For example, the program module 1093 that is meant for implementing identical operations to the functional configuration of the communication device 10 is stored in the hard disk drive 1090. Meanwhile, the hard disk drive 1090 can be replaced with an SSD (Solid State Drive).

Moreover, the setting data used in the operations according to the embodiment is stored as the program data 1094 in, for example, the memory 1010 or the hard disk drive 1090. Then, the CPU 1020 reads the program module 1093 and the program data 1094 as may be necessary from the memory 1010 or the hard disk drive 1090 into the RAM 1012, and executes the program module 1093.

Meanwhile, the program module 1093 and the program data 1094 are not limited to be stored in the hard disk drive 1090; and can alternatively be stored in, for example, a detachably-attachable memory medium and can be read by the CPU 1020 via the disk drive 1100. Still alternatively, the program module 1093 and the program data 1094 can be stored in another computer that is connected via a network (a LAN or a WAN). Then, the program module 1093 and the program data 1094 are read from the other computer by the CPU 1020 via the network interface 1070.

Herein, although the description is given about the embodiment of the invention made by the inventor(s), the technical scope of the present invention is not limited to the embodiment described above, and can be construed as embodying various deletions, alternative constructions, and modifications that may occur to one skilled in the art that fairly fall within the basic teaching herein set forth.

DESCRIPTION OF SIGNS

1 communication system
 2 client terminal
 3 web server
 4 network
 10 communication device
 11 communicating unit
 12 memory unit
 13 control unit
 121 static file substitution list storing unit
 122 keyword list storing unit
 131 substituting unit
 132 obfuscation target detecting unit
 133 obfuscation processing unit

The invention claimed is:

1. A communication device that is installed in between a client terminal and a web server which performs communication with the client terminal, the communication device comprising:

a memory; and processing circuitry coupled to the memory and configured to:

perform obfuscation of information included in a communication between the web server and the client terminal, with respect to information related to a web application, and send the communication, which includes information obfuscated at the performing, to destination, wherein when the content type of the HTTP response is an image, the processing circuitry is further configured to embed an arbitrary character string in a comment of the image, and the performing obfuscation includes embedding a random character string in a portion for embedding the comment.

2. The communication device according to claim 1, wherein, the processing circuitry is further configured to implement a method according to content type of an HTTP (HyperText Transfer Protocol) response and perform the obfuscation with respect to portion in which the information related to the web application is specified.

3. The communication device according to claim 2, wherein, the processing circuitry is further configured to:
store a keyword which is made of a character string peculiar to the web application in a first memory;
refer to the first memory and detect, as the information related to the web application, a character string similar to the keyword in an HTTP response sent from the web server; and
substitute the character string detected at the detecting with a character string obtained as a result of obfuscation.

4. The communication device according to claim 1, wherein, the processing circuitry is further configured to:
store pairs of a URL, which indicates a path to a static file peculiar to the web application, and an identifier, which is made of an arbitrary character string and which corresponds to the URL, in a second memory;
refer to the second memory;
substitute the identifier included in an HTTP response, which is sent from the client terminal, with the URL indicating the path to the static file peculiar to the web application corresponding to the identifier; and
substitute the URL, which indicates the path to the static file peculiar to the web application and which is included in an HTTP response sent from the web server, with the identifier corresponding to the URL.

5. A communication system comprising:
a client terminal;
a web server that performs communication with the client terminal; and
a communication device that is installed in between the client terminal and the web server, wherein
the communication device includes
a memory; and
processing circuitry coupled to the memory and configured to:
of information included in a communication between the web server and the client terminal, perform obfuscation with respect to information related to web application, and
send the communication, which includes the information obfuscated at the performing, to destination, wherein
when the content type of the HTTP response is an image, the processing circuitry is further configured to embed an arbitrary character string in a comment of the image, and
the performing obfuscation includes embedding a random character string in a portion for embedding the comment.

6. A non-transitory computer-readable recording medium storing therein a communication program that causes a computer to execute a process comprising:
performing obfuscation with respect to information related to a web application from among information included in a communication between a web server and a client terminal; and
sending the obfuscated information to destination, wherein
when the content type of the HTTP response is an image, the processing circuitry is further configured to embed an arbitrary character string in a comment of the image, and
the performing obfuscation includes embedding a random character string in a portion for embedding the comment.

* * * * *